(12) United States Patent
Liu et al.

(10) Patent No.: US 9,226,233 B2
(45) Date of Patent: Dec. 29, 2015

(54) REDUCING POWER CONSUMPTION IN A WIRELESS COMMUNICATION SYSTEM

(75) Inventors: Yong Liu, Campbell, CA (US); Raja Banerjea, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 457 days.

(21) Appl. No.: 13/450,222

(22) Filed: Apr. 18, 2012

(65) Prior Publication Data

US 2012/0263086 A1    Oct. 18, 2012

Related U.S. Application Data

(60) Provisional application No. 61/476,649, filed on Apr. 18, 2011, provisional application No. 61/497,909, filed on Jun. 16, 2011, provisional application No. 61/515,248, filed on Aug. 4, 2011, provisional application No. 61/531,862, filed on Sep. 7, 2011, provisional application No. 61/564,795, filed on Nov. 29, 2011.

(51) Int. Cl.
*G08C 17/00* (2006.01)
*H04W 52/02* (2009.01)

(52) U.S. Cl.
CPC ...... *H04W 52/0216* (2013.01); *H04W 52/0229* (2013.01); *Y02B 60/50* (2013.01)

(58) Field of Classification Search
CPC ............ H04W 72/1247; H04W 72/10; H04W 52/0216; H04W 52/0229
USPC ....................................................... 370/311
See application file for complete search history.

(56) References Cited

U.S. PATENT DOCUMENTS

| | | | |
|---|---|---|---|
| 7,599,332 B2 | 10/2009 | Zelst et al. | |
| 7,742,390 B2 | 6/2010 | Mujtaba | |
| 8,144,647 B2 | 3/2012 | Nabar et al. | |
| 8,155,138 B2 | 4/2012 | van Nee | |
| 8,289,869 B2 | 10/2012 | Sawai | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 8,867,653 B2 | 10/2014 | Zhang et al. | |
| 8,995,367 B2 | 3/2015 | Liu | |
| 2003/0012163 A1 | 1/2003 | Cafarelli et al. | |
| 2004/0203979 A1* | 10/2004 | Attar et al. | 455/522 |

(Continued)

FOREIGN PATENT DOCUMENTS

WO    WO-2012/122119 A1    9/2012

OTHER PUBLICATIONS

Low Power Capability Support for 802.11ah dated Jan. 17, 2011.*

(Continued)

*Primary Examiner* — Shripal Khajuria
*Assistant Examiner* — Faisal Choudhury

(57) ABSTRACT

A network interface of an access point device is configured to transmit to one or more first client stations in a first basic service set (BSS) a first value of a first parameter that indicates a time duration during which the access point device will not dissociate a client station due to not receiving at least one frame from the client station, and transmit to one or more second client stations in a second BSS a second value of the first parameter. The first value of the first parameter is at least an order of magnitude larger than the second value of the first parameter.

8 Claims, 10 Drawing Sheets

(56) References Cited

U.S. PATENT DOCUMENTS

| | | | |
|---|---|---|---|
| 2004/0218555 | A1 | 11/2004 | Chen et al. |
| 2007/0280246 | A1* | 12/2007 | Berkman et al. ............. 370/392 |
| 2007/0286222 | A1 | 12/2007 | Balasubramanian |
| 2008/0144558 | A1 | 6/2008 | Wentink |
| 2008/0146253 | A1 | 6/2008 | Wentink |
| 2008/0219196 | A1 | 9/2008 | Ptasinski |
| 2008/0310391 | A1 | 12/2008 | Schneidman et al. |
| 2009/0010191 | A1 | 1/2009 | Wentink |
| 2009/0016306 | A1 | 1/2009 | Wang et al. |
| 2009/0052362 | A1 | 2/2009 | Meier et al. |
| 2009/0109887 | A1 | 4/2009 | Chandra et al. |
| 2009/0196163 | A1 | 8/2009 | Du |
| 2009/0196211 | A1 | 8/2009 | Wentink |
| 2009/0196212 | A1 | 8/2009 | Wentink |
| 2009/0219847 | A1 | 9/2009 | Fischer |
| 2010/0165973 | A1 | 7/2010 | Su et al. |
| 2010/0192001 | A1 | 7/2010 | Cornwall et al. |
| 2010/0278088 | A1 | 11/2010 | Goldman |
| 2010/0284316 | A1 | 11/2010 | Sampathkumar |
| 2010/0309831 | A1 | 12/2010 | Yeh et al. |
| 2010/0315999 | A1 | 12/2010 | Kakani et al. |
| 2011/0002219 | A1 | 1/2011 | Kim et al. |
| 2011/0122780 | A1 | 5/2011 | Nieminen et al. |
| 2011/0176521 | A1* | 7/2011 | Park et al. .................... 370/336 |
| 2011/0268054 | A1* | 11/2011 | Abraham et al. ............. 370/329 |
| 2012/0106418 | A1 | 5/2012 | Xhafa et al. |
| 2012/0120858 | A1 | 5/2012 | Das et al. |
| 2012/0147800 | A1* | 6/2012 | Park et al. .................... 370/311 |
| 2012/0159001 | A1 | 6/2012 | Liu et al. |
| 2012/0201316 | A1 | 8/2012 | Zhang et al. |
| 2012/0219099 | A1 | 8/2012 | Loukianov |
| 2012/0263084 | A1 | 10/2012 | Liu et al. |
| 2012/0263085 | A1 | 10/2012 | Liu et al. |
| 2013/0176902 | A1* | 7/2013 | Wentink et al. .............. 370/255 |
| 2013/0258931 | A1 | 10/2013 | Gonikberg et al. |
| 2014/0153463 | A1* | 6/2014 | Park et al. .................... 370/311 |

OTHER PUBLICATIONS

U.S. Appl. No. 61/475,776 dated Apr. 15, 2011.*

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

International Search Report and Written Opinion in International Application No. PCT/US2012/034091 dated Nov. 27, 2012.

International Preliminary Report on Patentability in Int'l App. No. PCT/US2012/034091, mailed Oct. 31, 2013.

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

Perahia, et al., "Gigabit Wireless LANs: an overview of IEEE 802.11ac and 80211ad," ACM Sigmobile Mobile Computing and Communications Review, vol. 15, No. 3, pp. 23-33, Jul. 2011.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Yu, et al. "Coverage extension for IEEE802.11ah," *The Institute of Electrical and Electronics Engineers*, doc. No. IEEE 802.11-11/0035r1, (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Zhang et al., "11ah Data Transmission Flow," *The Institute of Electrical and Electronics Engineers*, doc. No. IEEE 802.11-11/1484r1, (Nov. 2011).

Park, "Proposed Specification Framework for TGah", *The Institute of Electrical and Electronics Engineers*, doc. No. IEEE 802.11-11/1137r6, (Mar. 2012).

Vermani, et al. "Preamble Format for 1 MHz," *The Institute of Electrical and Electronics Engineers*, doc. No. IEEE 802.11-11/1482r2, (Nov. 2011).

Zhang et al., "1MHz Waveform in Wider BW ", *The Institute of Electrical and Electronics Engineers*, doc. No. IEEE 802.11-12/0309r1, (Mar. 2012).

Vermani, et al. "Spec Framework Text for PHY Numerology," *The Institute of Electrical and Electronics Engineers*, doc. No. IEEE 802.11-11/1311r0, (Sep. 2011).

de Vegt, "Potential Compromise for 802.11ah Use Case Document," *The Institute of Electrical and Electronics Engineers, Inc.*, doc. No. IEEE 802.11-11/0457r0, (Mar. 2011).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, " *The Institute of Electrical and Electronics Engineers, Inc.*, Apr. 2003.

(56) References Cited

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11v™ /D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management *The Institute of Electrical and Electronics Engineers, Inc.*, 426 pages (Aug. 2010).

Mujtaba, S.A. "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

Park, "Proposed Specification Framework for TGah", *The Institute of Electrical and Electronics Engineers*, doc. No. IEEE 802.11-yy/xxxxr05, (Jan. 2012).

van Nee, et al. "The 802.11n MIMO—OFDM Standard for Wireless LAN and Beyond," Wireless Personal Communications, vol. 37, pp. 445-453 (Jun. 2006).

Office Action in U.S. Appl. No. 13/450,209, dated May 29, 2014 (18 pages).

Office Action in U.S. Appl. No. 13/450,209, dated Jan. 15, 2015 (19 pages).

Office Action in U.S. Appl. No. 13/450,220, dated Jun. 25, 2014 (18 pages).

Office Action in U.S. Appl. No. 13/450,220, dated Jan. 16, 2015 (17 pages).

Office Action in U.S. Appl. No. 13/450,220, dated Oct. 6, 2015 (20 pages).

Office Action in U.S. Appl. No. 13/450,209, dated Oct. 2, 2015 (20 pages).

\* cited by examiner

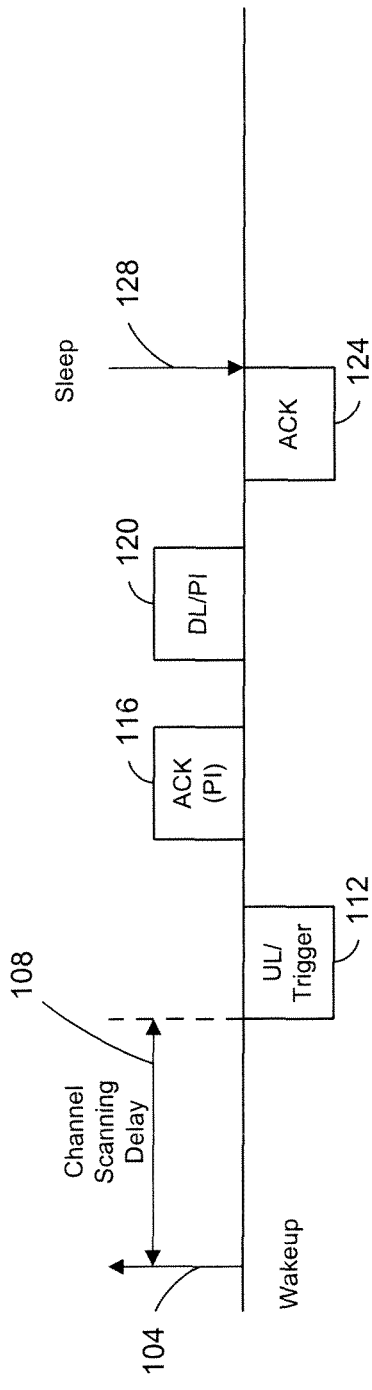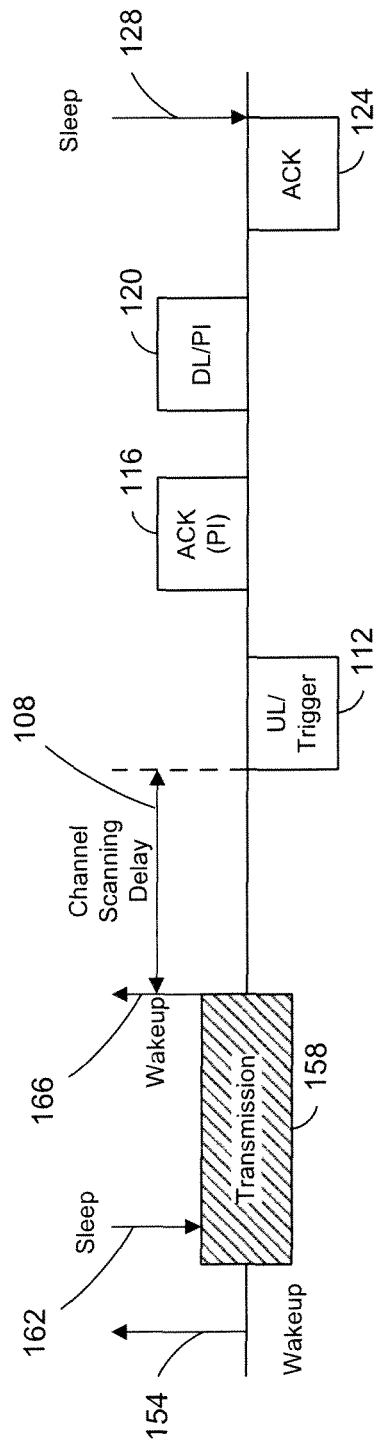

REDUCING POWER CONSUMPTION IN A WIRELESS COMMUNICATION SYSTEM

CROSS-REFERENCES TO RELATED APPLICATION

This disclosure claims the benefit of the following U.S. Provisional Patent Applications:

Application No. 61/476,679, entitled "802.11 Power Saving," filed on Apr. 18, 2011;

Application No. 61/497,909, entitled "802.11 Power Saving," filed on Jun. 16, 2011;

Application No. 61/515,248, entitled "802.11 Power Saving," filed on Aug. 4, 2011;

Application No. 61/531,862, entitled "802.11 Power Saving," filed on Sep. 7, 2011; and Application No. 61/564,795, entitled "802.11 Power Saving," filed on Nov. 29, 2011.

The disclosures of the above-identified applications are hereby incorporated by reference herein in their entireties.

Additionally, the present application is related to U.S. patent application Ser. No. 13/450,209, entitled "Reducing Power Consumption in a Wireless Communication System," and U.S. patent application Ser. No. 13/450,220, entitled "Reducing Power Consumption in a Wireless Communication System," both filed on the same day as the present application, and which are hereby incorporated by reference herein in their entireties.

FIELD OF TECHNOLOGY

The present disclosure relates generally to communication systems and, more particularly, to techniques for reducing power consumption by devices operating in a wireless communication system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. A standard currently under development, IEEE 802.11ac, promises to provide even greater throughput. More recently, work has also begun on another new standard, IEEE 802.11ah, that promises to provide greater range by operating in a lower, sub-1 gigahertz (GHz) frequency band.

The IEEE 802.11v Standard is related WLAN network management, and describes techniques for managing a network with devices that enter and exit a low power mode.

SUMMARY

In one embodiment, a method includes transmitting, with an access point device, to one or more first client stations in a first basic service set (BSS) a first value of a first parameter that indicates a time duration during which the access point device will not dissociate a client station due to not receiving at least one frame from the client station. Additionally, the method includes transmitting, with the access point device, to one or more second client stations in a second BSS a second value of the first parameter. The first value of the first parameter is at least an order of magnitude larger than the second value of the first parameter.

In another embodiment, an access point device for use in a wireless communication network comprises a network interface. The network interface is configured to transmit to one or more first client stations in a first basic service set (BSS) a first value of a first parameter that indicates a time duration during which the access point device will not dissociate a client station due to not receiving at least one frame from the client station, and transmit to one or more second client stations in a second BSS a second value of the first parameter. The first value of the first parameter is at least an order of magnitude larger than the second value of the first parameter.

In yet another embodiment, a method includes transmitting, in a wireless network, first data units associated with one or more power-constrained sensor devices; and transmitting, in the wireless network, second data units associated with offload of cellular telephone data. Priority is given to transmission of the first data units over transmission of the second data units with regard to access to a wireless medium.

In still another embodiment, an apparatus comprises a network interface configured to transmit, in a wireless network, first data units associated with offload of cellular telephone data, and give priority, with regard to access to a wireless medium, to transmission of the second data units associated with one or more power-constrained sensor devices in the wireless network over transmission of the first data units.

BRIEF DESCRIPTION OF THE DRAWINGS

FIG. 2 is a transmission timing diagram illustrating an example method in which a client station in a power save mode polls another device to determine whether the other device has downlink data buffered for the client station, according to an embodiment.

FIG. 3 is another transmission timing diagram illustrating another example method in which a client station in a power save mode polls another device to determine whether the other device has downlink data buffered for the client station, according to an embodiment.

DETAILED DESCRIPTION

In some wireless communication networks, devices will enter a low power mode (also referred to as a power save mode) to reduce power consumption. A first device in such a low power mode will power down at least some transceiver circuitry and thus is unable to receive or transmit data, in some embodiments. When the first device in the low power mode, a second device, such as an access point (AP), buffers data intended for the first device. The first device may exit the low power mode from time to time (i) to determine whether the second device (e.g., the AP) has data for the first device, and/or (ii) to transmit data to the second device (or another device). At least in some instances, the amount of power required for the first device to reestablish communications periodically with the second device in order to check for buffered data may be significant over time. Embodiments of techniques (i) for reducing the amount of power required by a device to exit a low power mode and to reestablish communications in a network, and/or (ii) to facilitate remaining in the low power mode for longer time periods are described below.

Figure 1:
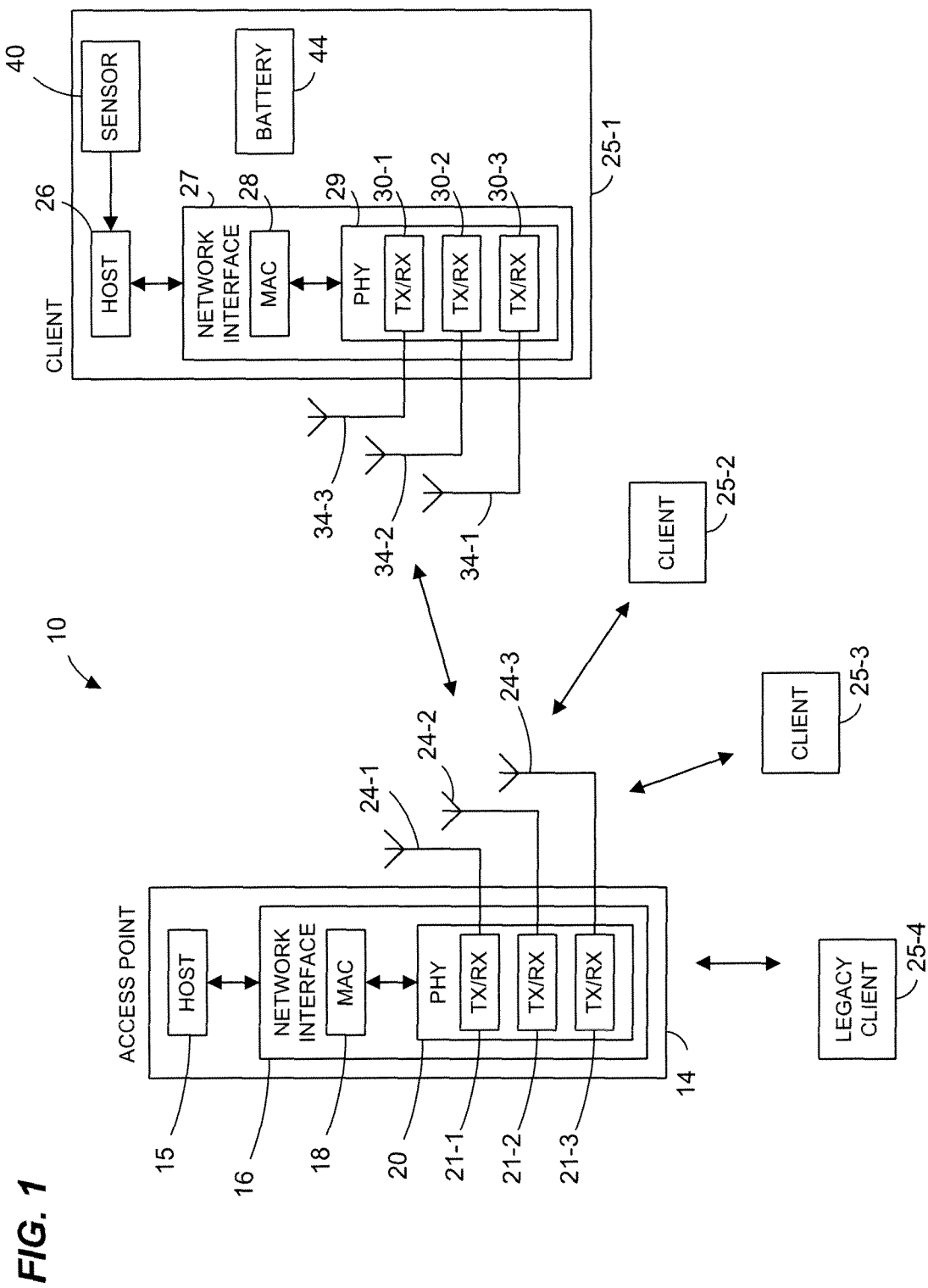
FIG. 1 is a block diagram of an example communication system that utilizes power saving techniques of the present disclosure, according to an embodiment.

FIG. 1 is a block diagram of an example communication system 10, according to an embodiment. The communication system 10 is a wireless local area network (WLAN), in an embodiment. In other embodiments, the communication system 10 is a wide area network (WAN), personal area network (PAN), or other type of communication system. An AP 14 in the system 10 includes a host processor 15 coupled to a network interface 16. The network interface 16 is coupled to a memory 17, and includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The communication system 10 also includes a plurality of client stations 25. Although three client stations 25 are illustrated in FIG. 1, the communication system 10 can include different numbers (e.g., 1, 2, 4, 5, 6, etc.) of client stations 25 in various scenarios and embodiments.

The client station 25-1 includes a host processor 26 coupled to a network interface 27. The network interface 27 is coupled to a memory 28, and includes a MAC processing unit 29 and a PHY processing unit 30. The PHY processing unit 30 includes a plurality of transceivers 31, and the transceivers 31 are coupled to a plurality of antennas 34. Although three transceivers 31 and three antennas 34 are illustrated in FIG. 1, the client station 25-1 can include different numbers (e.g., 1, 2, 4, 5, etc.) of transceivers 31 and antennas 34 in other embodiments. In an embodiment, one or both of the client stations 25-2 and 25-3 is the same as or similar to the client station 25-1.

In various embodiments, the PHY processing unit 20 of the AP 14 is configured to generate data units conforming to a communication protocol. The transceiver(s) 21 is/are configured to transmit the generated data units via the antenna(s) 24. Similarly, the transceiver(s) 21 is/are configured to receive data units conforming to the communication protocol via the antenna(s) 24.

In various embodiments, the PHY processing unit 30 of the client station 25-1 is configured to generate data units conforming to the communication protocol. The transceiver(s) 31 is/are configured to transmit the generated data units via the antenna(s) 34. Similarly, the transceiver(s) 31 is/are configured to receive data units conforming to the communication protocol via the antenna(s) 34.

In some embodiments, at least one of the client stations 25 includes a sensor 40 coupled to the host processor 26. Examples of sensors 40 utilized in various embodiments include a temperature sensor, a light sensor, a sound sensor, a motion detector, a pressure sensor, etc. In other embodiments, all of the client stations 25 omit the sensor 40. In one embodiment, the client stations 25 include (i) a first set of one or more client stations 25 with sensors 40, and (ii) a second set of one or more client stations 25 that omit sensors 40. A client station 25 with a sensor 40 is sometimes referred to herein as a sensor device.

In some embodiments, at least one of the client stations 25 includes a battery 40. The battery 40 is coupled to the network interface 27 and the network interface 27 is powered, at least in part, by the battery 40, in some embodiments. In some embodiments, the host processor 26 is also coupled to and powered, at least in part, by the battery 40. In some embodiments in which the client device 25 includes a sensor 40, the sensor 40 is coupled to the battery 44 and the sensor is powered, at least in part, by the battery 44. In other embodiments, all of the client stations 25 omit the battery 44. In one embodiment, the client stations 25 include (i) a first set of one or more client stations 25 with batteries 44, and (ii) a second set of one or more client stations 25 that omit batteries 44. In some embodiments, the network interface 27 of the client station 25 goes into a low power mode (e.g., a power save mode) to conserve power and thus to preserve battery life of the batter 44. In some embodiments that omit the battery 44, the network interface 27 of the client station 25 also goes into the power save mode to conserve power.

In an embodiment, a sensor device 25 is battery powered and configured to operate on a single battery charge for a long period of time (e.g., at least 30 days, at least 60 days, at least 100 days, at least one year, etc.). In such embodiments, the sensor device 25 is power-constrained and/or operates on very low power (as compared to a smart phone or a laptop computer, for example).

When the network interface 27 of the client station 25 is to go into the power save mode, the network interface 27 generates and transmits a first notification to the AP 14 that indicates that the network interface 27 is entering the power save mode. When the network interface 27 of the client station 25 exits the power save mode, in some circumstances, the network interface 27 generates and transmits a second notification to the AP 14 that indicates that the network interface 27 has exited the power save mode. While the network interface 27 of the client station 25 is in the power save mode, from the standpoint of the AP 14 (e.g., after receiving the first notification that indicates that the network interface 27 is entering the power save mode and before receiving the second notification that indicates that the network interface 27 has exited the power save mode), the AP 14 will buffer data intended for transmission from the AP 14 to the client station 25. Additionally, while the network interface 27 of the client station 25 is in the power save mode, from the standpoint of the AP 14, the AP 14 will transmit to the client station 25 data buffered by the AP 14 only in response to requests from the client station 25, as will be described in more detail below, in some embodiments.

In some embodiments, the network interface 16 of the AP 14 is configured to cause the AP 14 to transmit a beacon frame periodically. In some embodiments, the period between successive beacon frames is a set time period, referred to as a beacon period. The network interface 16 of the AP 14 generates the beacon frame to include information to facilitate synchronization of devices in the communication system 10. For example, in an embodiment, each beacon frame includes a time stamp corresponding to a clock of the network interface 16, and each client station 25 (e.g., network interface 27 of the client station 25) is configured to update a clock of the network interface 27 using the time stamp in the beacon frame. For instance, clock drift between clocks in the AP 14 and the clocks in the client stations 25 may occur, and the time stamps in the beacons are utilized to correct the clocks of the client stations 25 to mitigate the clock drift.

According to the current IEEE 802.11 Standard, each beacon frame includes information that indicates, for each client station 25 in the power save mode, whether the AP 14 has buffered downlink data (i.e., data to be transmitted from the AP 14 to the client station 25). Thus, according to the current IEEE 802.11 Standard, a client station 25 in the power save mode uses a clock of the network interface 27 of the client station 25 to estimate when a beacon will be transmitted by the AP 14. The network interface 27 of the client station 25 wakes up (e.g., exits the power save mode) at a time prior to when the beacon is estimated and listens for the beacon. The client station 25 analyzes the beacon to determine whether the AP 14 has buffered downlink data for the client station 25. If the client station 25 determines that the AP 14 has buffered downlink data for the client station 25, the client station 25 transmits a data unit to the AP 14 requesting the AP 14 to transmit buffered downlink data to the client station 25. If the client station 25 determines that the AP 14 does not have buffered downlink data for the client station 25, the client station 25 reenters the power save mode and waits for the next beacon.

The network interface 27 of the client station 25 exits the power save state earlier than an estimated time of the beacon because of clock drift between the clock of the network interface 27 of the client station 25 and the clock of the network interface 16 of the AP 14. For example, because the network interface 27 utilizes the clock of the network interface 27 to estimate when a subsequent beacon will be transmitted whereas the network interface 16 of the AP 14 utilizes the clock of the network interface 16 to determine when to transmit the subsequent beacon, and because the clock of the network interface 27 and the clock of the network interface 16 are not exactly synchronized (e.g., there is clock drift), there will likely be an error between when the network interface 16 transmits the beacon and when the network interface 27 estimates the beacon will be transmitted. Additionally, this error will increase the farther into the future the beacon will occur. In other words, the longer the network interface 27 of the client station 25 is in a power save mode, the more clock drift between the clock of the network interface 27 and the clock of the network interface 16 of the AP 14 may occur, and thus the earlier, prior to an estimated time of a beacon transmission, the network interface 27 should exit the power save mode in order to compensate for the possible clock drift error and to avoid missing the beacon. Thus, the network interface 27 must wake up sufficiently early and consume power in order to make sure that the beacon is not missed.

FIG. 2 is a transmission timing diagram illustrating an embodiment of a method in which a client station in a power save mode polls another device (e.g., an AP) to determine whether the other device has downlink data buffered for the client station. The timing diagram of FIG. 2 will be described with reference to FIG. 1 for ease of explanation. In other embodiments, however, a suitable system different than the system 10 of FIG. 1 may utilize the method illustrated in FIG. 2.

In FIG. 2, a client station 25 is in a power save mode and powers up at least a portion of the network interface 27 in order to communicate with the AP 14 to determine whether the AP 14 has buffered downlink data for the client station 25. At a time 104, the network interface 27 is powered up and ready to transmit and receive. The network interface 27 scans the wireless medium for a minimum time period 108 in order to determine whether the medium is busy. If the medium is not busy at least for the minimum time period 108 (e.g., the network interface 27 does not detect any transmissions during the time period 108), the network interface 27 generates and transmits a data unit 112 that prompts the AP 14 to respond with an indication of whether the AP 14 has buffered downlink data for the client station 25. The data unit 112 may be referred to as a trigger or a poll. In some embodiments, the data unit 112 includes uplink data (i.e., data to be transmitted from the client station 25 to the AP 14) when the client station 25 has uplink data to be transmitted. In an embodiment, the data unit 112 omits uplink data even when the client station 25 has uplink data to be transmitted.

In response to the trigger 112, the AP 14 determines whether the AP 14 has buffered downlink data for the client station 25. Also in response to the trigger 112, the AP 14 generates and transmits to the client station 25 an acknowledgment data unit 116. In an embodiment, the acknowledgment data unit 116 includes an indication (e.g., a pending data indication (PI)) of whether the AP 14 has buffered downlink data for the client station 25. In another embodiment, the acknowledgment to the trigger 112 does not include the PI. Rather, in an embodiment, a separate data unit transmitted after the acknowledgment to the trigger 112 includes the PI. In an embodiment, the separate data unit that includes the PI is transmitted after the acknowledgment to the trigger 112 and at least a certain time period (e.g., a point coordination function (PCF) interframe space (PIFS) duration, or another suitable time period) after the acknowledgment.

The network interface 27 of the client station 25 analyzes the PI in the data unit 116, and determines whether the AP 14 has buffered downlink data for the client station 25 based on the analysis of the PI in the data unit 116. In response to determining that the AP 14 does not have buffered downlink data for the client station 25, the network interface 27 may power down at least partially (i.e., so that the network interface 27 cannot transmit or receive via the wireless medium) until some subsequent time, in some embodiments and/or scenarios (e.g., when the client station 25 does not have uplink data to be transmitted to the AP 14). FIG. 2, however, illustrates a scenario in which the AP 14 does have downlink data buffered for the client station 25. Thus, in response to determining that the AP 14 does have buffered downlink data for the client station 25, the network interface 27 remains powered up to wait to receive downlink data from the AP 14.

Because the AP 14 has downlink data buffered for the client station 25, the AP 14 generates and transmits to the client station a data unit 120 that includes downlink data for the client station 25. In an embodiment, the data unit 120 is transmitted after the acknowledgment data unit 116. In an embodiment, the AP 14 also determines whether the AP 14 has additional buffered downlink data for the client station 25, and includes in the data unit 120 an indication (e.g., a PI) of whether the AP 14 has additional buffered downlink data for the client station 25. In another embodiment, the PI is not included in the data unit 120.

In an embodiment, and in a scenario in which the AP 14 has downlink data buffered for the client station 25, the data unit that includes the PI and the data unit that includes downlink data are combined into a single data unit. For example, in an embodiment, the data unit 116 includes downlink data and the data unit 120 is omitted (if, for example, there is not additional downlink data buffered at the AP 14).

The network interface 27 of the client station 25 receives and processes the data unit 120. In response to receiving the data unit 120, the network interface 27 generates and transmits to the AP 14 an acknowledgment data unit 124. Additionally, in embodiments in which the data unit 120 includes a PI, the network interface 27 analyzes the PI in the data unit 120 and determines whether the AP 14 has additional buffered downlink data for the client station 25 based on the analysis of the PI in the data unit 120. In response to determining that the AP 14 does not have buffered downlink data for the client station 25, the network interface 27 may power down at least partially (i.e., so that the network interface 27 cannot transmit or receive via the wireless medium) at a time 128 and until some subsequent time, in some embodiments and/or scenarios (e.g., when the client station 25 does not have uplink data to be transmitted to the AP 14). The time 128 occurs after the transmission of the acknowledgment 124, in an embodiment.

In a scenario in which the PI in the data unit 120 indicates that the AP 14 does have downlink data buffered for the client station 25, the network interface 27, in response to determining that the AP 14 does have buffered downlink data for the client station 25, remains powered up to wait to receive additional downlink data from the AP 14, according to an embodiment. In an embodiment, the AP 14 generates and transmits to the client station 25 an additional data unit (not shown) that includes downlink data for the client station 25, and the additional data unit is transmitted, not in response to a further explicit request from the client station 25, but in response to receiving the acknowledgment data unit 124. In an embodiment, the AP 14 also determines whether the AP 14 has additional buffered downlink data for the client station 25, and includes in the additional data unit (not shown) an indication (e.g., a PI) of whether the AP 14 has additional buffered downlink data for the client station 25. In another embodiment, the PI is not included in the additional data unit. The AP 14 transmits the additional data unit (not shown) is after receiving the acknowledgment data unit 124.

In another embodiment and/or in some scenarios, however, when the AP 14 has additional buffered downlink data for the client station 25, the AP 14, does not transmit an additional data unit (as discussed above) in response to receiving the acknowledgment data unit 124. Rather, in an embodiment, the AP 14 waits to receive a further request from the client station 25 for the AP 14 to transmit buffered downlink data to the client station 25. Thus, in an embodiment in which the data unit 120 includes a PI, the network interface 27, in response to determining that the AP 14 has additional buffered downlink data for the client station 25 (based on analysis of the PI), the network interface 27 transmits a request (not shown) to the AP 14 for the AP 14 to transmit to the client station 25 buffered downlink data for the client station 25. In some embodiments and/or scenarios, the network interface 27 remains powered up after transmitting the acknowledgment data unit 124 in order to transmit the request. In some embodiments and/or scenarios, the network interface 27 powers down at least partially after transmitting the acknowledgment data unit 124 and remains powered down for a time period before later powering up to transmit the request.

FIG. 3 is another transmission timing diagram illustrating an embodiment of a method in which a client station in a power save mode polls another device (e.g., an AP) to determine whether the other device has downlink data buffered for the client station. The timing diagram of FIG. 3 will be described with reference to FIG. 1 for ease of explanation. In other embodiments, however, a suitable system different than the system 10 of FIG. 1 may utilize the method illustrated in FIG. 3.

In FIG. 3, a client station 25 is in a power save mode and powers up at least a portion of the network interface 27 in order to communicate with the AP 14 to determine whether the AP 14 has buffered downlink data for the client station 25. At a time 154, the network interface 27 is powered up and ready to transmit and receive. The network interface 27 scans the wireless medium for a minimum time period in order to determine whether the medium is busy. In the scenario illustrated in FIG. 3, the network interface 27 detects that the medium is busy prior to the minimum time period expiring. In particular, the network interface 27 detects a transmission 158. In response to detecting the transmission 158, the network interface 27 powers down at least partially at a time 162.

Also in response to detecting the transmission 158, the network interface 27 determines when the network interface 27 should power back up (e.g., determine a sleep time duration). In an embodiment, determining when the network interface 27 should power back up is based on a backoff time period. The backoff time period is randomly or pseudorandomly determined, in an embodiment. As used hereinafter, the phrases "randomly determining" and "randomly determined" a time period are encompass both randomly and pseudorandomly determining the time period. In an embodiment, the backoff period is determined using techniques such as those described in the IEEE 802.11 Standard with regard to the enhanced distributed channel access (EDCA) mechanism. In other embodiments, other suitable techniques for determining the backoff period are utilized. In an embodiment, determining when the network interface 27 should power back includes determining a length of the transmission 158. For example, as will be described in more detail below, the network interface 27 may utilize information in the transmission 158 to determine the length of the transmission 158. Additionally, determining when the network interface 27 should power back includes determining other associated time periods associated with the transmission 158, such as a time period for another device to transmit an acknowledgment data unit for the transmission 158.

In the example of FIG. 3, the network interface 27 powers up at time 166. The remaining activity illustrated in FIG. 3 is the same as or similar to the activity discussed with respect to FIG. 2.

If the medium is not busy at least for the minimum time period 108 (i.e., the network interface 27 does not detect any transmissions during the time period 108), the network interface 27 generates and transmits a data unit 112 that prompts the AP 14 to respond with an indication of whether the AP 14 has buffered downlink data for the client station 25. The data unit 112 may be referred to as a trigger or a poll. In some embodiments, the data unit 112 includes uplink data (i.e., data to be transmitted from the client station 25 to the AP 14) when the client station 25 has uplink data to be transmitted. In an embodiment, the data unit 112 omits uplink data even when the client station 25 has uplink data to be transmitted.

Referring now to FIGS. 2 and 3, in some embodiments and/or scenarios, the network interface 27 transmits the data unit 112 without first knowing whether the whether the AP 14 has buffered downlink data for the client station 25. In other words, in some embodiments and/or scenarios, prior to the time at which the data unit 112 is transmitted, the network interface 27 does not have knowledge that the AP 14 has downlink data buffered for the client station 25. Thus, in some embodiments and/or scenarios, the network interface 27 utilizes the data unit 112 to prompt the AP 14 to report to the client station 25 whether the AP 14 has buffered downlink data for the client station 25 so that the network interface 27 can ascertain whether the AP 14 has downlink data buffered for the client station 25. In some embodiments and/or scenarios, the network interface 27 need not first receive and analyze a beacon data unit to determine whether the AP 14 has downlink data buffered for the client station 25.

In some embodiments, the network interface 27 performs a method as generally illustrated in FIGS. 2 and/or 3 periodically when the network interface 27 is in the power save mode. For example, in an embodiment, the network interface 27 attempts to transmit a data unit such as the data unit 112 to the AP 14 periodically when the network interface 27 is in the power save mode. In another embodiment, the network interface 27 performs a method as generally illustrated in FIGS. 2 and/or 3 when the network interface 27 is in the power save mode and when the client station 25 has uplink data to transmit to the AP 14. For example, in an embodiment, the network interface 27 attempts to transmit a data unit such as the data unit 112 to the AP 14 when the network interface 27 is in the power save mode and when the client station 25 has uplink data to transmit to the AP 14. In another embodiment, the network interface 27 performs a method as generally illustrated in FIGS. 2 and/or 3 periodically and/or when the network interface 27 is in the power save mode and when the client station 25 has uplink data to transmit to the AP 14. For example, in an embodiment, the network interface 27 attempts to transmit a data unit such as the data unit 112 to the AP 14 when the network interface 27 is in the power save mode and when the client station 25 has uplink data to transmit to the AP 14. On the other hand, when the network interface 27 is in the power save mode but the client station 25 does not have uplink data to transmit to the AP 14, the network interface 27 attempts to transmit a data unit such as the data unit 112 to the AP 14 periodically.

Figure 4:
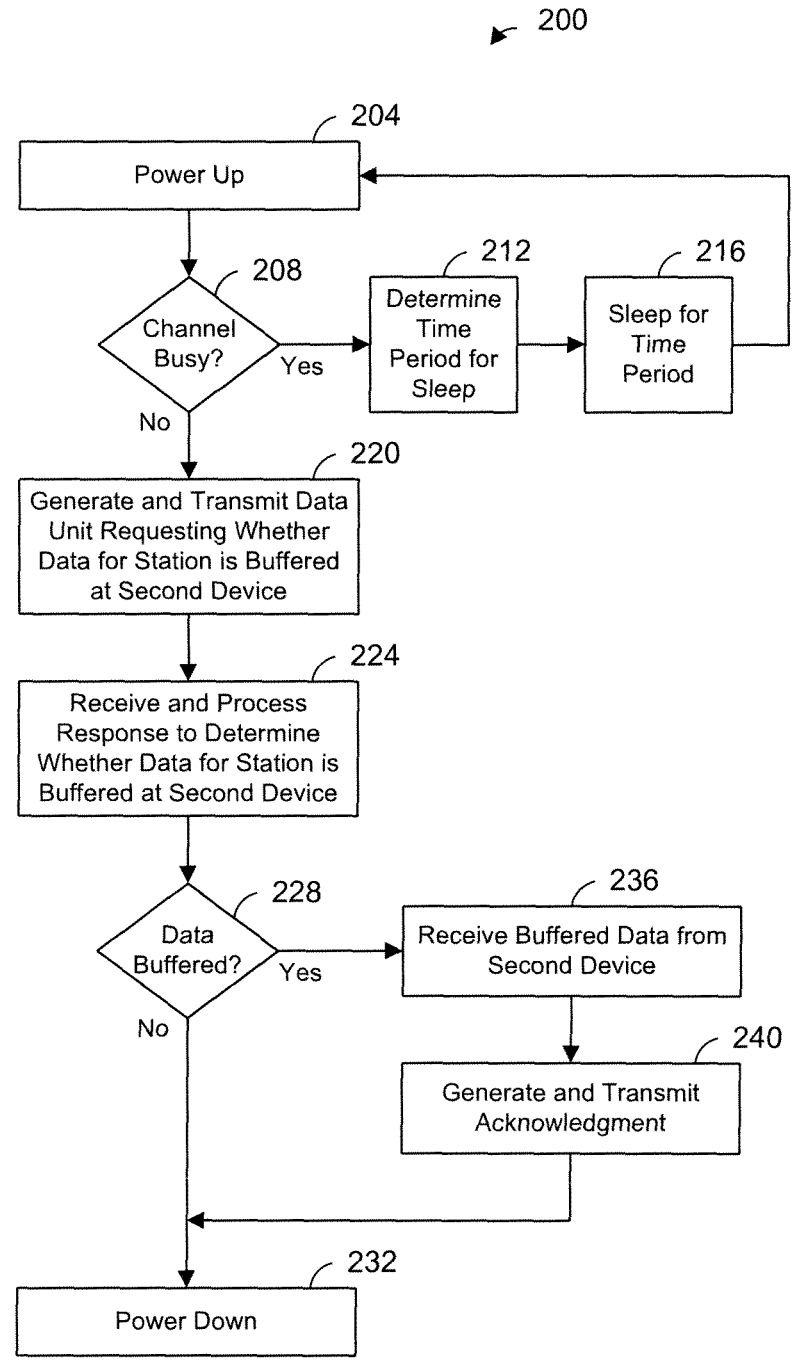
FIG. 4 is a flow diagram of an example method for determining whether one wireless device has downlink data buffered for the another wireless device, and, if the one wireless device has downlink data buffered for the other wireless device, obtaining downlink data from the one wireless device, according to an embodiment.

FIG. 4 is a flow diagram of an example method 200, implemented by a first wireless device (e.g., a client station 25) in a power save mode, for determining whether a second wireless device (e.g., the AP 14) has downlink data buffered for the first wireless device, and, if the second wireless device has downlink data buffered for the first wireless device, obtaining downlink data from the second wireless device. FIG. 4 will be described with reference to FIGS. 1-3 for ease of explanation. In other embodiments, however, a suitable system different than the system 10 of FIG. 1 may utilize the method 200. In some embodiments, the first device is a client station and the second device is an AP, and the method 200 will described in this context for ease of explanation. In other embodiments, however, both the first device and the second device are client stations (e.g., in an ad-hoc network).

At block 204, a network interface of the first device (e.g., the network interface 27 of the client station 25) powers up so that the network interface 27 is ready to transmit and receive. At block 208, the network interface 27 determines whether a wireless communication channel is busy. For example, in an embodiment, the network interface 27 scans the wireless communication channel for a minimum time period in order to determine whether the wireless communication channel is busy.

In an embodiment, determining whether the wireless communication channel is busy at block 208 includes using techniques such as those described in the IEEE 802.11 Standard with regard to the enhanced distributed channel access (EDCA) mechanism. In other embodiments, other suitable techniques for determining whether the wireless communication channel is busy at block 208 are utilized.

In an embodiment, block 208 includes (i) performing a signal detection process during a first period, and (ii) a contention backoff period starting when it is determined that the channel is idle. The signal detection process includes (a) detecting a start of a transmission and/or (b) detecting an ongoing transmission, in some embodiments. Detecting a start of a transmission includes performing preamble detection, in an embodiment. Detecting a start of a transmission includes detecting a change in signal energy, in an embodiment. Detecting an ongoing transmission includes performing guard interval (GI) detection, in an embodiment in which the wireless communication system utilizes orthogonal frequency division multiplexing (OFDM) modulation. Detecting an ongoing transmission includes signal energy detection, in an embodiment. In some embodiments in which the network interface 27 is not capable of GI detection, the signal detection process includes at least one of (i) waiting at least a minimum time period related to a frame transmission period, such as a typical frame transmission period or a maximum frame transmission period, or (ii) waiting until detecting a preamble to help prevent interference with a transmission that cannot be detected by an energy detection method, in an embodiment.

In an embodiment, the contention backoff period is determined using techniques such as those described in the IEEE 802.11 Standard with regard to the enhanced distributed channel access (EDCA) mechanism. In other embodiments, other suitable techniques for determining the contention backoff period are utilized.

If it is determined that the wireless communication channel is busy, the flow proceeds to block 212, at which the network interface 27 determines a time period for the network interface 27 to remain powered down. In an embodiment, determining time period for the network interface 27 to remain powered down includes determining and/or utilizing a backoff time period that is at least a portion of the time period for the network interface 27 to remain powered down. Determining the backoff time period includes randomly determining a time period that is at least a portion of the backoff time period, in an embodiment. In an embodiment, determining the backoff period utilizes techniques such as those described in the IEEE 802.11 Standard with regard to the enhanced distributed channel access (EDCA) mechanism. In other embodiments, other suitable techniques for determining the backoff period are utilized.

In an embodiment, determining the time period for the network interface 27 to remain powered down includes determining a length of a detected transmission (e.g., the transmission 158 of FIG. 3). For example, the network interface 27 may utilize information in the detected transmission to determine the length of the detected transmission. In an embodiment, the network interface 27 may utilize information in a preamble of a data unit to determine a duration of occupation of the channel associated with the data unit. In an embodiment, the network interface 27 may utilize information in a delimiter of a header of a data unit to determine a duration of occupation of the channel associated with the data unit. In an embodiment, the network interface 27 may utilize information in a MAC header of a data unit to determine a duration of occupation of the channel associated with the data unit. In an embodiment, the network interface 27 may utilize information in at least two of (i) preamble of the data unit, (ii) a delimiter of a header of the data unit, and (iii) a MAC header of the data unit, to determine a duration of occupation of the channel associated with the data unit. Additionally, determining the time period for the network interface 27 to remain powered down includes determining other associated time periods associated with the detected transmission, such as a time period for another device to transmit an acknowledgment data unit for the transmission 158.

At block 216, the network interface 27 powers down for the time period determined at block 216. After the time period determined at block 216, the network device powers up at block 204.

In some embodiments, blocks 212 and 216 are omitted. In these embodiments, if it is determined at block 208 that the wireless communication channel is busy, the network interface remains powered up and repeatedly checks whether the wireless communication channel is busy, for example.

If, on the other hand, it is determined at block 208 that the wireless communication channel is not busy, the flow proceeds to block 220. At block 220, the network interface 27 generates and transmits a data unit that prompts the AP 14 to respond with an indication of whether the AP 14 has buffered downlink data for the client station 25. In some embodiments, the data unit includes uplink data (i.e., data to be transmitted from the client station 25 to the AP 14) when the client station 25 has uplink data to be transmitted. In an embodiment, the data unit omits uplink data even when the client station 25 has uplink data to be transmitted. Referring to FIGS. 2 and 3, the data unit transmitted at block 220 is the data unit 112, in an embodiment.

At block 224, the network interface 27 receives and processes a data unit transmitted by the AP 14 in response to the data unit transmitted by the network interface 27 at block 220. The data unit received at block 224 includes an indication (e.g., a pending data indication (PI)) of whether the AP 14 has buffered downlink data for the client station 25. Referring to FIGS. 2 and 3, the data unit received at block 224 is the acknowledgment data unit 116, in an embodiment. In another embodiment, the data unit received at block 224 is a separate data unit from an acknowledgement data unit that acknowledges the data unit transmitted at block 220.

The network interface 27 of the client station 25 analyzes the PI in the data unit received at block 224, and determines whether the AP 14 has buffered downlink data for the client station 25 based on the analysis of the PI in the data unit received at block 224. If it is determined that the AP 14 does not have buffered downlink data for the client station 25, the flow proceeds to block 232, at which the network interface 27 powers down at least partially (i.e., so that the network interface 27 cannot transmit or receive via the wireless medium) until some subsequent time, in some embodiments and/or scenarios (e.g., when the client station 25 does not have uplink data to be transmitted to the AP 14).

On the other hand, if it is determined at block 228 that the AP 14 does have buffered downlink data for the client station 25, the flow proceeds to block 236. At block 236, the network interface 27 receives buffered downlink data from the AP 14. At block 240, the network interface 27 generates and transmits an acknowledgment data unit in response to receiving the buffered downlink data at block 236. The flow then proceeds to block 232, in an embodiment. In other embodiments, the network interface 27 remains powered up to receive additional buffered downlink data from the AP 14 when the AP 14 indicates (e.g., using a PI in a data unit that carries buffered downlink data at block 236) that the AP 14 has additional buffered downlink data to transmit to the client 25.

In an embodiment, downlink data received at block 236 is included in the data unit received at block 224. In another embodiment, downlink data received at block 236 is included in a data unit separate from the data unit received at block 224. For example, the separate data unit is transmitted a certain time period (e.g., PIFS specified in the IEEE 802.11 Standard, or another suitable time period) after the data unit received at block 224.

In some embodiments and/or scenarios, the network interface of the first device transmits the data unit of block 220 without first knowing whether the whether the second device has buffered downlink data for the client station 25. In other words, in some embodiments and/or scenarios, prior to the time at which the data unit of block 220 is transmitted, the network interface of the first device does not have knowledge that the second device has downlink data buffered for the first device. Thus, in some embodiments and/or scenarios, the network interface of the first device utilizes the data unit of block 220 to prompt the second device to report to the first device whether the second device has buffered downlink data for the first device so that the network interface of the first device can ascertain whether the second device has downlink data buffered for the first device. In some embodiments and/or scenarios, the network interface of the first device need not first receive and analyze a beacon data unit transmitted by the second device to determine whether the second device has data buffered for the first device.

In some embodiments, a network interface of the first device (e.g., the network interface 27) performs the method 200 (or a similar method) periodically when the network interface is in the power save mode. For example, in an embodiment, the network interface of the first device attempts to transmit a data unit such as the data unit 112 to the second device periodically when the network interface of the first device is in the power save mode. In another embodiment, the network interface of the first device performs the method 200 (or a similar method) when the network interface 27 is in the power save mode and when the first device has uplink data to transmit to the second device. For example, in an embodiment, the network interface of the first device attempts to transmit a data unit such as the data unit 112 to the second device when the network interface of the first device is in the power save mode and when the first device has uplink data to transmit to the second device. In another embodiment, the network interface of the first device the method 200 (or a similar method) periodically and/or when the network interface of the first device is in the power save mode and when the first device has uplink data to transmit to the second device. For example, in an embodiment, the network interface of the first device attempts to transmit a data unit such as the data unit 112 to the second device when the network interface of the first device is in the power save mode and when the first device has uplink data to transmit to the second device. On the other hand, when the network interface of the first device is in the power save mode but the first device does not have uplink data to transmit to the second device, the network interface of the first device attempts to transmit a data unit such as the data unit 112 to the second device periodically.

Figure 5:
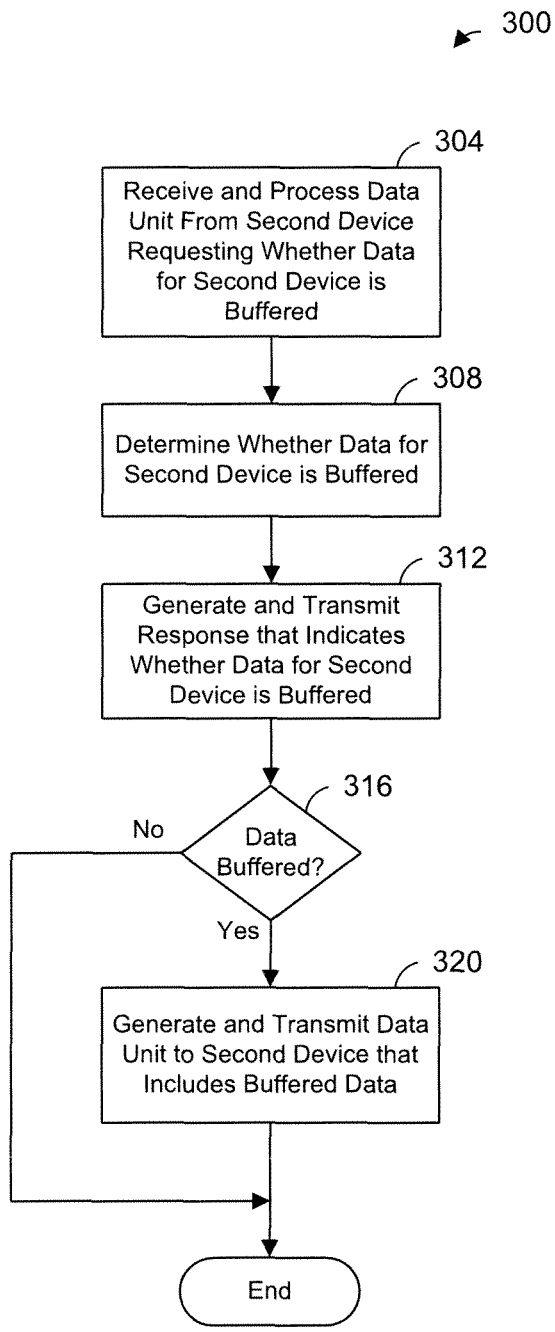
FIG. 5 is a flow diagram of an example method for responding to an inquiry from a first wireless device regarding whether a second wireless device has downlink data buffered for the first wireless device, and, if the second wireless device has downlink data buffered for the first wireless device, to transmit downlink data to the first wireless device, according to an embodiment.

FIG. 5 is a flow diagram of an example method 300, implemented by a first wireless device (e.g., the AP 14), for responding to an inquiry from a second wireless device (e.g., a client station 25) regarding whether the first wireless device has downlink data buffered for the second wireless device, and, if the first wireless device has downlink data buffered for the first wireless device, to transmit downlink data to the second wireless device. FIG. 5 will be described with reference to FIGS. 1-3 for ease of explanation. In other embodiments, however, a suitable system different than the system 10 of FIG. 1 may utilize the method 300. In some embodiments, the first device is an AP and the second device is a client station, and the method 300 will described in this context for ease of explanation. In other embodiments, however, both the first wireless device and the second wireless device are client stations (e.g., in an ad-hoc network).

At block 304, the network interface 16 of the AP 14 receives and processes a data unit from the client station 25 that requests the AP 14 to transmit to the client station 25 an indication of whether the AP 14 has buffered downlink data for the client station 25. In some embodiments, the data unit received at block 304 includes uplink data (i.e., data transmitted by the client station 25 to the AP 14). In an embodiment, the data unit received at block 304 omits uplink data. Referring to FIGS. 2 and 3, the data unit received at block 304 is the data unit 112, in an embodiment.

At block 308, it is determined whether the AP 14 has buffered downlink data for the client station 25. In an embodiment, the determination at block 308 is performed in response to the data unit received at block 304. In another embodiment, the determination at block 308 is performed prior to receiving the data unit at block 304. For example, the determination is performed prior to receiving the data unit at block 304 and an indication of the determination is stored in a memory of the AP 14. In an embodiment, block 308 is performed by the network interface 16. In another embodiment, block 308 is performed by the host processor 15. In an embodiment, block 308 is performed by the network interface 16 and the host processor 15.

At block 312, the network interface 16 of the AP 14 generates and transmits to the client 25 a data unit in response to the data unit received from the client 25 at block 304. The data unit generated at block 312 includes an indication (e.g., a pending data indication (PI)) of whether the AP 14 has buffered downlink data for the client station 25. Referring to FIGS. 2 and 3, the data unit generated and transmitted at block 312 is the acknowledgment data unit 116, in an embodiment. In another embodiment, the network interface 16 generates and transmits an acknowledgment data unit that acknowledges the data unit received from the client at block 304, where the acknowledgment data unit does not include the PI. Rather, in an embodiment, the network interface 16 generates and transmits a data unit separate from (and transmitted after) the acknowledgment data unit that acknowledges the data unit received at block 304, where the separate data unit includes the PI.

At block 316, the network interface 16 of the AP 14 determines whether to transmit buffered downlink data to the client device 25. For example, if it was determined at block 308 that there is no data buffered for the client device 25, the flow ends. On the other hand, if it was determined that there is data buffered for the client device 25, the network interface 16 of the AP 14, at block 320, generates and transmits to the client device 25 a data unit that includes downlink data buffered by the AP 14.

In an embodiment, downlink data transmitted at block 320 is included in the data unit transmitted at block 312. In another embodiment, downlink data transmitted at block 320 is included in a data unit separate from the data unit transmitted at block 312. For example, the separate data unit is transmitted a certain time period (e.g., PIFS specified in the IEEE 802.11 Standard, or another suitable time period) after the data unit transmitted at block 312. Referring to FIGS. 2 and 3, the data unit generated and transmitted at block 320 is the data unit 120, in an embodiment.

In an embodiment, it is determined if there will be additional downlink data buffered for the client device 25 at the AP 14 after transmission of the data unit at block 320. In an embodiment, if it determined that there will be additional downlink data buffered for the client device 25, the data unit is generated at block 320 to include an indication (e.g., a pending data indication (PI)) of whether the AP 14 has additional buffered downlink data for the client station 25. In an embodiment, the determination if there will be additional buffered downlink data is performed by the network interface 16. In another embodiment, the determination if there will be additional buffered downlink data is performed by the host processor 15. In an embodiment, the determination if there will be additional buffered downlink data is performed by the network interface 16 and the host processor 15.

In an embodiment, if there is additional buffered data for the client device 25, the network interface 16 of the AP 14 generates and transmits to the client device 25 one or more further data units that include downlink data buffered by the AP 14 without further prompting by the client device 25. In another embodiment, if there is additional buffered data for the client device 25, the network interface 16 of the AP 14 generates and transmits to the client device 25 one or more further data units that include downlink data buffered by the AP 14 in response to further prompts by the client device 25.

Referring to blocks 308 and 312 of FIG. 5, in an embodiment, the data unit that includes the indication of whether the AP 14 has buffered downlink data for the client station 25 includes indications of whether the AP 14 has buffered downlink data for a plurality of client stations 25 in a basic service set (BSS) associated with the AP 14. For example, the data unit may include a bitmap, where different bits in the bitmap correspond to different client stations 25 in the BSS, in an embodiment. A first value of a bit (e.g., logic zero) indicates that the AP 14 does not have buffered downlink data for the client station corresponding to the bit, whereas a second value of the bit (e.g., logic one) indicates that the AP 14 does have buffered downlink data for the client station corresponding to the bit. In some embodiments, the data unit includes an information element the same as or similar to the traffic indication map (TIM) element defined in the IEEE 802.11 Standard. In an embodiment, the data unit includes, in addition to information the same as or similar to information in the TIM element defined in the IEEE 802.11 Standard, at least one of (i) multicast/broadcast timing information, (ii) a timestamp, and (iii) update information for the BSS. In various embodiments, the data unit includes, in addition to information the same as or similar to information in the TIM element defined in the IEEE 802.11 Standard, only one of (i) multicast/broadcast timing information, (ii) a timestamp, or (iii) update information for the BSS. In various embodiments, the data unit includes, in addition to information the same as or similar to information in the TIM element defined in the IEEE 802.11 Standard, only two of (i) multicast/broadcast timing information, (ii) a timestamp, and (iii) update information for the BSS. In an embodiment, the data unit includes, in addition to information the same as or similar to information in the TIM element defined in the IEEE 802.11 Standard, (i) multicast/broadcast timing information, (ii) a timestamp indicating a clock value of the AP 14 when the data unit was transmitted, and (iii) update information for the BSS.

In an embodiment, the multicast/broadcast timing information includes included in the data unit (i) information that indicates whether the AP 14 has broadcast and/or multicast information to transmit for the polling client station 25, and/or (ii) information to enable the polling client station 25 to determine when the AP 14 will transmit broadcast and/or multicast data units for the client station 25. In some embodiments, the multicast/broadcast timing information includes one or more of (i) a count value that indicates how many beacon frames appear before a next delivery traffic indication message (DTIM), (ii) a DTIM period value that indicates the number of beacon intervals between successive DTIMs, (iii) one or more flexible multicast service (FMS) counters that each indicate how many DTIM beacons until the AP 14 transmits multicast data corresponding to an FMS stream, (iii) an indication of when the AP 14 will next transmit broadcast and/or multicast data (e.g., in turns of a number of beacons (e.g., a beacon count), a timing synchronization function (TSF) timer value, an offset from a current time, etc.) for the client station 25.

In some embodiments, the update information for the BSS includes changes, or indications of change, to parameters for communication within the BSS. In an embodiment, the update information for the BSS includes operation mode changes for the BSS.

In an embodiment that utilizes an information element similar to the TIM defined in the IEEE 802.11 Standard, the AP 14 compares an identifier of the client station 25 (e.g., an association identifier (AID)) with a parameters N1 and N2 associated with the TIM, where N1 is the largest even number such that bits numbered 1 through (N1×8)−1 in a bitmap (which indicates which client stations 25 have buffered downlink data and for which different bits correspond to different client stations 25) are all 0 and N2 is the smallest number such that bits numbered (N2+1)×8 through 2007 in the bitmap are all 0. In particular, the AP 14 compares the AID of the client station 25 with {N1*8−1} and {(N2+1)*8} to determine whether the AID falls into the virtual partial bitmap (VPB) of the TIM element. If it is determined that the AID is greater than or equal to {N1*8−1} and less than {(N2+1)*8}, the data unit of block 312 is generated to include the VPB in the data unit of block 312. On the other hand, if it is determined that the AID is less than {N1*8−1} or greater than or equal to {(N2+1)*8}, the data unit of block 312 is generated to (i) omit the VPB in the data unit of block 312, (ii) the Partial Virtual Bitmap field is encoded as a single octet equal to 0, a Bitmap Offset subfield is encoded as 0, and a Length field is encoded as 4, and/or (iii) a field is included to indicate that there is no data buffered for the client station 25.

In another embodiment, if it is determined that the AID is greater than or equal to {N1*8−1} and less than {(N2+1)*8}, the network interface 16 further checks a smaller region within the VPB that contains the AID bit. If a value of the smaller region is zero (i.e., none of the bits in the region is "1"), the data unit of block 312 is generated to (i) omit the VPB in the data unit of block 312, or (ii) the Partial Virtual Bitmap field is encoded as a single octet equal to 0, a Bitmap Offset subfield is encoded as 0, and a Length field is encoded as 4. Otherwise, if the value of the smaller region is not zero, the data unit of block 312 is generated to include only the smaller region as the VPB in the TIM.

In another embodiment, if it is determined that the AID is greater than or equal to {N1*8−1} and less than {(N2+1)*8}, the network interface 16 checks the bit within the VPB that corresponds to the AID bit to determine whether the AP 14 has buffered data for the client station 25. Additionally, the data unit of block 312 is generated to include a flag that indicates whether the AP 14 has downlink data buffered for the client station 25.

In some embodiments, an information element the same as or similar to the TIM defined in the IEEE 802.11 Standard is prepared prior to receiving the data unit of block 304 and stored in a memory of or accessible by the network interface 16 of the AP 14. In such embodiments, the network interface 16 of the AP 14 able to retrieve the information element from the memory in order to respond quickly to the data unit received at block 304. As discussed above, in some embodiments, the AP 14 transmits a data unit that includes the information element and one or more of (i) multicast/broadcast timing information, (ii) a timestamp, and (iii) update information for the BSS.

Figure 6:
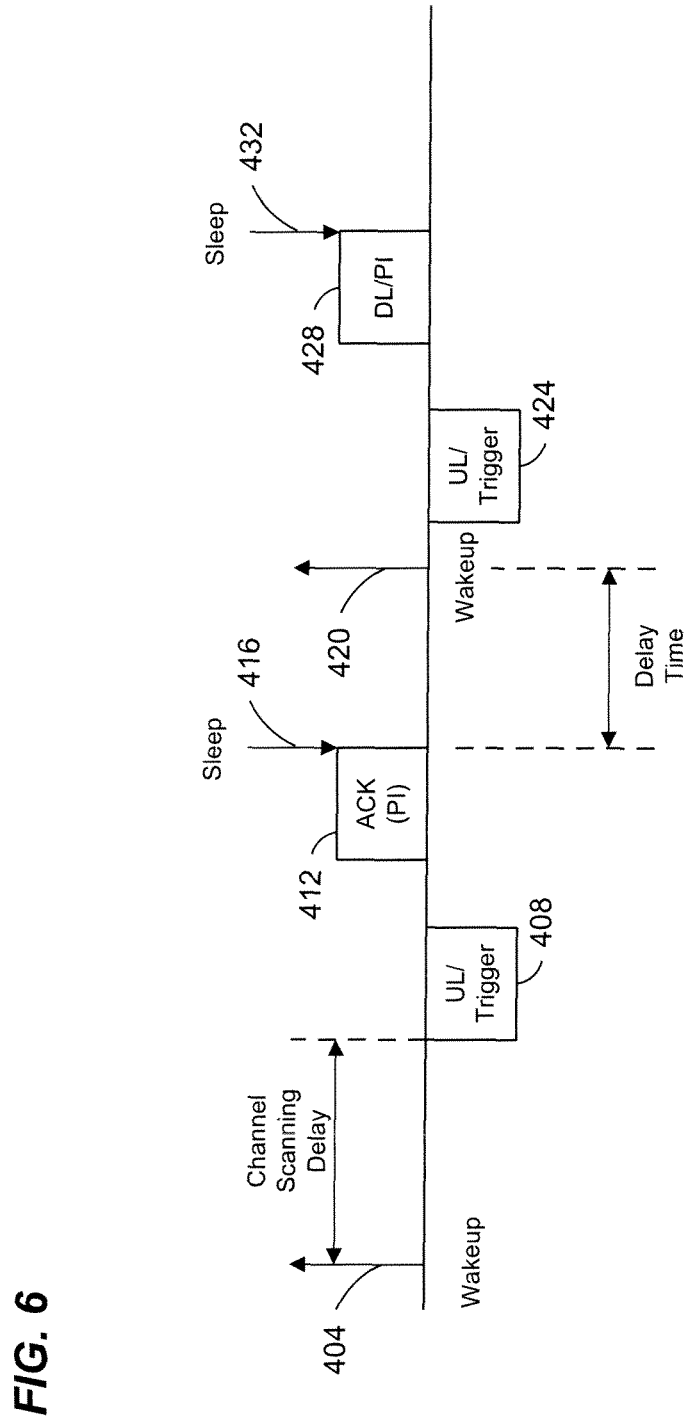
FIG. 6 is a transmission timing diagram illustrating another example method in which one station in a power save mode polls another station to determine whether the other station has downlink data buffered for the one station, according to an embodiment.

FIG. 6 is a transmission timing diagram illustrating another embodiment of a method in which a client station in a power save mode polls another device (e.g., an AP) to determine whether the other device has downlink data buffered for the client station. The timing diagram of FIG. 6 will be described with reference to FIG. 1 for ease of explanation. In other embodiments, however, a suitable system different than the system 10 of FIG. 1 may utilize the method illustrated in FIG. 6.

In FIG. 6, a client station 25 is in a power save mode and powers up at least a portion of the network interface 27 in order to communicate with the AP 14 to determine whether the AP 14 has buffered downlink data for the client station 25. At a time 404, the network interface 27 is powered up and ready to transmit and receive. The network interface 27 scans the wireless medium for a minimum time period in order to determine whether the medium is busy, as discussed above. If the medium is not busy at least for the minimum time period, the network interface 27 generates and transmits a data unit 408 that prompts the AP 14 to respond with an indication of whether the AP 14 has buffered downlink data for the client station 25. The data unit 408 may be referred to as a trigger or a poll. In some embodiments, the data unit 408 includes uplink data (i.e., data to be transmitted from the client station 25 to the AP 14) when the client station 25 has uplink data to be transmitted. In an embodiment, the data unit 408 omits uplink data even when the client station 25 has uplink data to be transmitted.

In response to the trigger 408, the AP 14 determines whether the AP 14 has buffered downlink data for the client station 25. Also in response to the trigger 408, the AP 14 generates and transmits to the client station 25 an acknowledgment data unit 412. In an embodiment, the acknowledgment data unit 412 includes an indication (e.g., a pending data indication (PI)) of whether the AP 14 has buffered downlink data for the client station 25. In another embodiment, the acknowledgment to the trigger 408 does not include the PI. Rather, in an embodiment, a separate data unit transmitted after the acknowledgment to the trigger 408 includes the PI. In an embodiment, the separate data unit that includes the Pt is transmitted after the acknowledgment to the trigger 408 and at least a certain time period (e.g., a point coordination function (PCF) interframe space (PIFS) duration, or another suitable time period.

In an embodiment, when the AP 14 has downlink data buffered for the client station 25, the data unit 412 also includes an indication of a delay time after which the AP 14 will transmit downlink data to the client station 25. For example, it may take the AP 14 some time to process the trigger 408 and/or to prepare for a transmission of downlink data to the client station 25. Thus, the AP 14 includes the indication of the delay time to facilitate powering down the network interface 27 of the client station 25 during the delay. In an embodiment, the delay time corresponds to a minimum time before which the network interface 27 of the client station 25 should not poll the AP 14 for buffered downlink data. In another embodiment, the delay time corresponds to a time of transmission of a next beacon frame. In an embodiment, the network interface 16 of the AP 14 is configured to determine the delay time. In another embodiment, the host processor 15 is configured to determine the delay time.

The network interface 27 of the client station 25 analyzes the PI in the data unit 412, and determines whether the AP 14 has buffered downlink data for the client station 25 based on the analysis of the PI in the data unit 116. In response to determining that the AP 14 does not have buffered downlink data for the client station 25, the network interface 27 may power down at least partially (i.e., so that the network interface 27 cannot transmit or receive via the wireless medium) until some subsequent time, in some embodiments and/or scenarios (e.g., when the client station 25 does not have uplink data to be transmitted to the AP 14). FIG. 6, however, illustrates a scenario in which the AP 14 does have downlink data buffered for the client station 25.

The network interface 27 of the client station 25 also analyzes the indication of the delay time in the data unit 412 to determine a time period for the network interface 27 to power down. Then, the network interface 27 powers down at least partially at a time 416. The time 416 occurs after the end of the transmission of the data unit 412, in an embodiment.

The network interface 27 powers back up at a time 420, which is determined based on the indication of the delay time in the data unit 412. Subsequently, the network interface 27 generates and transmits a data unit 424 that prompts the AP 14 to transmit buffered downlink data for the client station 25. The data unit 424 may be referred to as a trigger or a poll. In some embodiments, the data unit 424 includes uplink data (i.e., data to be transmitted from the client station 25 to the AP 14) when the client station 25 has uplink data to be transmitted. In an embodiment, the data unit 424 omits uplink data even when the client station 25 has uplink data to be transmitted. In some embodiments, the data unit 424 is transmitted only after determining that the medium is not busy at least for the minimum time period.

In response to the trigger 424, the AP 14 generates and transmits to the client station a data unit 428 that includes downlink data for the client station 25. In an embodiment, the AP 14 also determines whether the AP 14 has additional buffered downlink data for the client station 25, and includes in the data unit 428 an indication (e.g., a PI) of whether the AP 14 has additional buffered downlink data for the client station 25. In another embodiment, the PI is not included in the data unit 428.

The network interface 27 of the client station 25 receives and processes the data unit 428. In embodiments in which the data unit 428 includes a PI, the network interface 27 analyzes the PI in the data unit 428 and determines whether the AP 14 has additional buffered downlink data for the client station 25 based on the analysis of the PI in the data unit 428. In response to determining that the AP 14 does not have buffered downlink data for the client station 25, the network interface 27 may power down at least partially (i.e., so that the network interface 27 cannot transmit or receive via the wireless medium) at a time 432 and until some subsequent time, in some embodiments and/or scenarios (e.g., when the client station 25 does not have uplink data to be transmitted to the AP 14).

In some embodiments, the network interface generates and transmits an acknowledgment (not shown) in response to receiving the data unit 428.

In a scenario in which the PI in the data unit 428 indicates that the AP 14 does have additional downlink data buffered for the client station 25, the network interface 27, in response to determining that the AP 14 does have buffered downlink data for the client station 25, remains powered up to wait to receive additional downlink data from the AP 14, according to an embodiment. In an embodiment, the AP 14 generates and transmits to the client station 25 an additional data unit (not shown) that includes downlink data for the client station 25, and the additional data unit is transmitted, not in response to a further explicit request from the client station 25, but in response to receiving an acknowledgment of the data unit 428.

In another embodiment and/or in some scenarios, however, the AP 14, when the AP 14 has additional buffered downlink data for the client station 25, does not transmit an additional data unit (as discussed above) in response to receiving an acknowledgment of the data unit 428. Rather, in an embodiment, the AP 14 waits to receive a further request from the client station 25 for the AP 14 to transmit buffered downlink data to the client station 25. Thus, in an embodiment in which the data unit 428 includes a PI, the network interface 27, in response to determining that the AP 14 has additional buffered downlink data for the client station 25 (based on analysis of the PI), the network interface 27 transmits a request (not shown) to the AP 14 for the AP 14 to transmit to the client station 25 buffered downlink data for the client station 25. In some embodiments and/or scenarios, the network interface 27 remains powered up after transmitting an acknowledgment of the data unit 428 in order to transmit the request. In some embodiments and/or scenarios, the network interface 27 powers down at least partially after transmitting an acknowledgment of the data unit 428 and remains powered down for a time period before later powering up to transmit the request.

In another embodiment, the AP 14, in response to the trigger frame 408, schedules transmission of downlink data to the client station 25 at a later time. In an embodiment, the network interface 16 of the AP 14 is configured to determine a schedule for transmitting downlink data to the client station 25. In another embodiment, the host processor 15 of the AP 14 is configured to determine a schedule for transmitting downlink data to the client station 25. Scheduling transmission of downlink data to the client station 25 includes utilizing time division multiple access (TDMA) scheduling techniques or other suitable techniques. In an embodiment information that indicates a schedule for transmission of downlink data to the client station 25 is included in one or more beacon frames. Thus, the network interface 27 of the client station 25 receives and processes the one or more beacon frames to determine a schedule for transmission of downlink data for the client station 25. In an embodiment, after determining the schedule for transmission of downlink data, the network interface 27 powers down at least partially until a scheduled downlink transmission by the AP 14 and powers back up in time to receive the scheduled downlink transmission.

Additionally, in an embodiment in which the AP 14 is configured to schedule transmission of downlink data to the client station 25 and to include schedule information in one or more beacons, the network interface 16 of the AP 14 is configured to include in an acknowledgment data unit that acknowledges the trigger frame 408 information to facilitate the network interface 27 of the client station 25 to power down at least partially until a next beacon frame that includes at least some of the scheduling information is transmitted by the AP 14. For example, the information includes an estimated time at which the next beacon frame is to be transmitted, in an embodiment. As another example, the information includes a time stamp to facilitate the network interface 27 of the client station 25 to adjust a clock of the network interface 27 to adjust for clock drift between the clock of the network interface 27 of the client station 25 and the clock of the network interface 16 of the AP 14, in an embodiment.

In an embodiment in which the AP 14 is configured to schedule transmission of downlink data to the client station 25, the network interface 27 of the client station 25 may be configured to include in the trigger frame 408 an indication of whether the client station 25 has additional uplink data to be transmitted to the AP 14. In an embodiment, the network interface 16 of the AP 14 is configured to process the trigger frame 408 (i.e., to process the indication of whether the client station 25 has additional uplink data to be transmitted to the AP 14) to determine whether the client station 25 has additional uplink data to be transmitted to the AP 14. When the network interface 16 of the AP 14 determines that the client station 25 has additional uplink data to be transmitted to the AP 14, the network interface 16 schedules transmission of uplink data by the client station 25. Scheduling transmission of uplink data by the client station 25 includes utilizing TDMA scheduling techniques or other suitable techniques. In an embodiment, information that indicates a schedule for transmission of uplink data by the client station 25 is included in one or more beacon frames. Thus, the network interface 27 of the client station 25 receives and processes the one or more beacon frames to determine a schedule for transmitting, by the client station 25, uplink data. In an embodiment, after determining the schedule for transmission of uplink data and/or a transmission of downlink data, the network interface 27 powers down at least partially until the earlier of (i) a scheduled downlink transmission by the AP 14 and (ii) a scheduled time for transmission of uplink data by the client station 25, and powers back up in time to either (i) receive the scheduled downlink transmission or (ii) transmit uplink data at a scheduled time.

In some embodiments, a client device 25 in a power save mode uses a trigger frame (such as the trigger frame 112 (FIGS. 2, 3), the trigger frames 408, 424 (FIG. 6), or another suitable trigger frame) to determine whether the AP 14 has broadcast data and/or multicast data (for a group of client devices including the client device 25) to be transmitted. For example, in response to a trigger frame (such as described above) transmitted by a client device 25, the AP 14 transmits a data unit that indicates whether the AP 14 has broadcast data and/or multicast data (for a group including the client device 25) to be transmitted, in an embodiment. The data unit responsive to the trigger frame additionally includes information regarding timing of the broadcast and/or multicast data, in an embodiment. For example, the AP 14 may subsequently transmit information in a particular beacon frame that indicates when the AP 14 will transmit the broadcast/multicast data, and the data unit responsive to the trigger includes information indicating which beacon will include the information that indicates when the AP 14 will transmit the broadcast/multicast data, in an embodiment.

Figure 7:
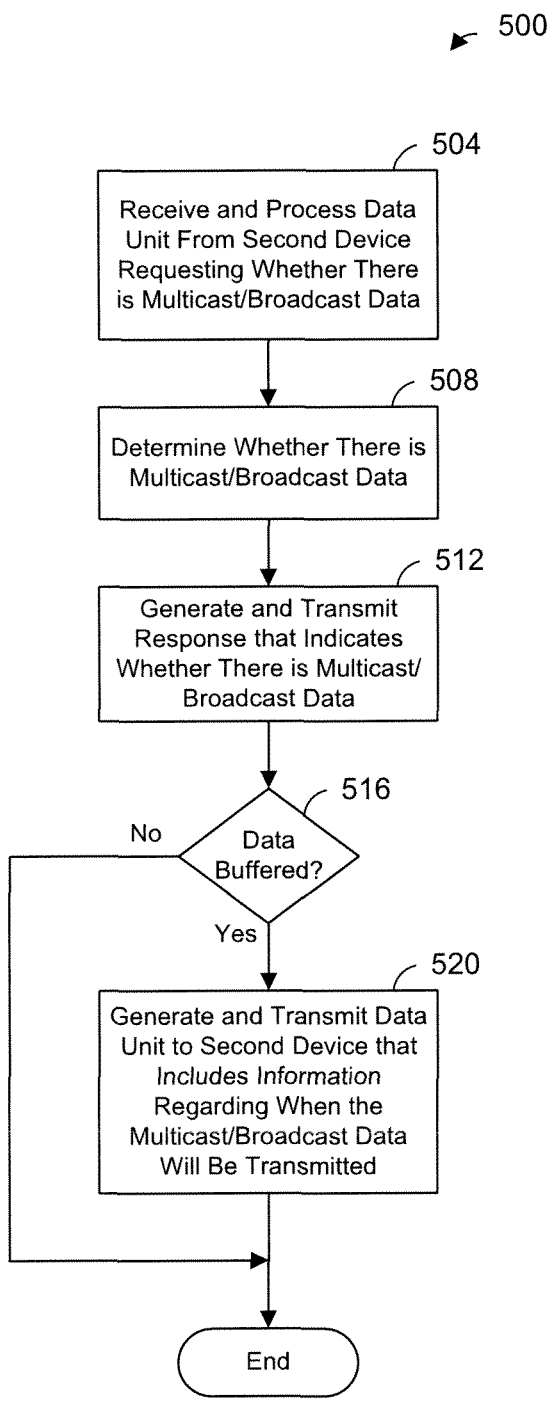
FIG. 7 is a flow diagram of an example method for responding to an inquiry from first wireless device regarding whether a second wireless device has multicast and/or broadcast data to be transmitted by the second wireless device, and, if the second wireless device has multicast/broadcast data to be transmitted, to transmit information regarding when the second wireless device will transmit multicast/broadcast data, according to an embodiment.

FIG. 7 is a flow diagram of another example method 500, implemented by a first wireless device (e.g., the AP 14), for responding to an inquiry from a second wireless device (e.g., a client station 25) regarding whether the first wireless device has multicast and/or broadcast data to be transmitted by the first wireless device, and, if the first wireless device has multicast/broadcast data to be transmitted, to transmit information regarding when the first wireless device will transmit multicast/broadcast data. FIG. 7 will be described with reference to FIG. 1 for ease of explanation. In other embodiments, however, a suitable system different than the system 10 of FIG. 1 may utilize the method 500. In some embodiments, the first device is an AP and the second device is a client station, and the method 500 will be described in this context for ease of explanation. In other embodiments, however, both the first wireless device and the second wireless device are client stations (e.g., in an ad-hoc network).

At block 504, the network interface 16 of the AP 14 receives and processes a data unit from the client station 25 that requests the AP 14 to transmit to the client station 25 an indication of whether the AP 14 has broadcast data and/or multicast data for the client station 25. In some embodiments, the data unit received at block 504 includes uplink data (i.e., data transmitted by the client station 25 to the AP 14). In an embodiment, the data unit received at block 504 omits uplink data. Referring to FIGS. 2 and 3, the data unit received at block 304 is similar to the data unit 112, in an embodiment. In an embodiment, the data unit received at block 504 includes a group address corresponding to the client station 25 to facilitate the AP 14 quickly determining whether there is multicast data for the client station 25. In an embodiment, the data unit received at block 504 includes one or more of (i) FMS counter information corresponding to the client station 25, or (ii) FMS identifier (ID) information corresponding to the client station 25, to facilitate the AP 14 quickly determining whether there is multicast data for the client station 25.

At block 508, it is determined whether the AP 14 has broadcast data and/or multicast data for the client station 25. In an embodiment, the determination at block 508 is performed in response to the data unit received at block 504. In another embodiment, the determination at block 508 is performed prior to receiving the data unit at block 504. For example, the determination is performed prior to receiving the data unit at block 504 and an indication of the determination is stored in a memory of the AP 14. In an embodiment, block 508 is performed by the network interface 16. In another embodiment, block 508 is performed by the host processor 15. In an embodiment, block 508 is performed by the network interface 16 and the host processor 15. In an embodiment in which the data unit received at block 504 includes a group address corresponding to the client station 25, block 508 includes utilizing the group address received at block 504 to determine whether there is multicast data for the client station 25.

At block 512, the network interface 16 of the AP 14 generates and transmits to the client 25 a data unit in response to the data unit received from the client 25 at block 504. The data unit generated at block 512 includes an indication of whether the AP 14 has broadcast data and/or multicast data for the client station 25.

At block 516, if it was determined at block 508 that there is no broadcast data and/or multicast data for the client station 25, the flow ends. On the other hand, if it was determined at block 508 that there is data buffered for the client device 25, the network interface 16 of the AP 14, at block 520, generates and transmits to the client device 25 a data unit that includes information regarding timing of the broadcast and/or multicast data, in an embodiment. For example, the AP 14 may subsequently transmit information in a particular beacon frame that indicates when the AP 14 will transmit the broadcast/multicast data, and the data unit responsive to the trigger includes information indicating which beacon will include the information that indicates when the AP 14 will transmit the broadcast/multicast data, in an embodiment.

In an embodiment, downlink data transmitted at block 520 is included in the data unit transmitted at block 512. In other words, data transmitted at blocks 512 and 520 are included in a single data unit, in an embodiment. In an embodiment, the data unit is generated to also include at least one of (i) a timestamp, and (ii) update information for the BSS. In various embodiments, the data unit is generated to include only one of (i) a timestamp, or (ii) update information for the BSS. In an embodiment, the data unit is generated to include both of (i) a timestamp, and (ii) update information for the BSS.

In another embodiment, downlink data transmitted at block 520 is included in a data unit separate from the data unit transmitted at block 512. For example, the separate data unit is transmitted a certain time period (e.g., PIFS specified in the IEEE 802.11 Standard, or another suitable time period) after the data unit transmitted at block 512.

Figure 8:
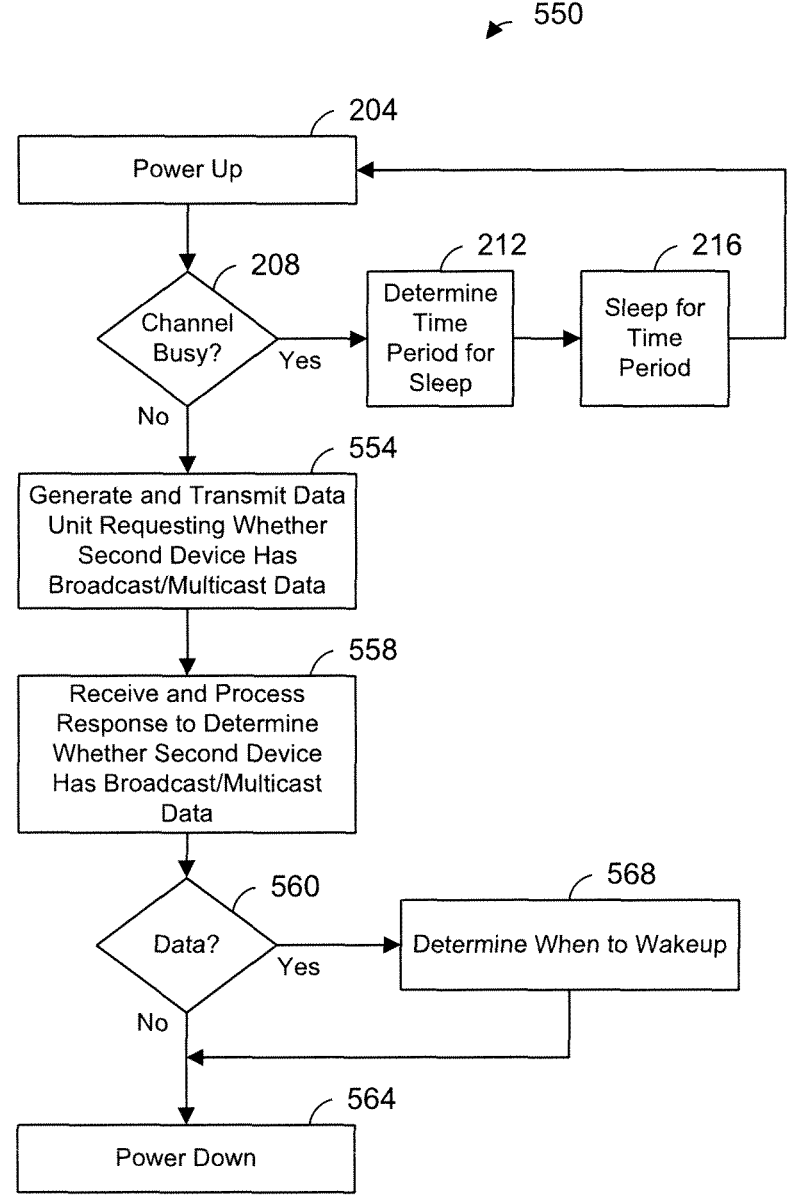
FIG. 8 is a flow diagram of an example method for determining whether a first wireless device has broadcast data and/or multicast data for a second wireless device, and if the first wireless device has broadcast data and/or multicast data for the second wireless device, obtaining information from the first wireless device to enable receiving the broadcast data and/or multicast data, according to an embodiment.

FIG. 8 is a flow diagram of an example method 550, implemented by a first wireless device (e.g., a client station 25) in a power save mode, for determining whether a second wireless device (e.g., the AP 14) has broadcast data and/or multicast data for the first wireless device, and if the second wireless device has broadcast data and/or multicast data for the client station 25, obtaining information from the second wireless device to enable receiving the broadcast data and/or multicast data for the client station 25. FIG. 8 will be described with reference to FIG. 1 for ease of explanation. In other embodiments, however, a suitable system different than the system 10 of FIG. 1 may utilize the method 550. In some embodiments, the first device is a client station and the second device is an AP, and the method 550 will described in this context for ease of explanation. In other embodiments, however, both the first device and the second device are client stations (e.g., in an ad-hoc network).

In an embodiment, blocks 204, 208, 212 and 216 are the same as or similar to like-numbered blocks discussed with respect to FIG. 4, and are not described further.

If it is determined at block 208 that the wireless communication channel is not busy, the flow proceeds to block 554. At block 554, the network interface 27 generates and transmits a data unit that prompts the AP 14 to respond with an indication of whether the AP 14 has broadcast data and/or multicast data for the client station 25. In some embodiments, the data unit includes uplink data (i.e., data to be transmitted from the client station 25 to the AP 14) when the client station 25 has uplink data to be transmitted. In an embodiment, the data unit omits uplink data even when the client station 25 has uplink data to be transmitted. Referring to FIGS. 2 and 3, the data unit transmitted at block 554 is similar to the data unit 112 (FIGS. 2 and 3), in an embodiment. In an embodiment, the data unit of block 554 is generated to include a group address corresponding to the client station 25 to facilitate the AP 14 quickly determining whether there is multicast data for the client station 25.

At block 558, the network interface 27 receives and processes a data unit transmitted by the AP 14 in response to the data unit transmitted by the network interface 27 at block 554. The data unit received at block 558 includes an indication of whether the AP 14 has broadcast data and/or multicast data for the client station 25. If the AP 14 has broadcast data and/or multicast data for the client station 25, the data unit additionally includes information indicating which subsequent beacon will include the information that indicates when the AP 14 will transmit the broadcast/multicast data, in an embodiment. In another embodiment, a separate data unit includes the information indicating which subsequent beacon will include the information that indicates when the AP 14 will transmit the broadcast/multicast data.

In an embodiment, the data unit received at block 558 also includes at least one of (i) a timestamp, and (ii) update information for the BSS. In various embodiments, the data unit received at block 558 includes only one of (i) a timestamp, or (ii) update information for the BSS. In an embodiment, the data unit received at block 558 includes both of (i) a timestamp, and (ii) update information for the BSS.

In an embodiment, the data unit generated at block 554 includes one or more indications of whether the client station 25 is requesting additional information. In an embodiment, the AP 14 analyzes the data unit generated at block 554 to determine what information is being requested by the client station 25, and generates and transmits a data unit in response that includes the requested information. For example, in an embodiment, the data unit generated at block 554 includes one or more indications of (i) a request for a timestamp, and (ii) a request for updated information for the BSS. In response to the one or more indications, the AP 14 determines what information is being requested by the client station 25 (if any), and responsively provides in the data unit received at block 558 one or more of (i) a time stamp, and (ii) a request for updated information for the BSS.

The network interface 27 of the client station 25 analyzes the data unit received at block 558, and determines (block 560) whether the AP 14 has broadcast data and/or multicast data for the client station 25 based on the analysis. If it is determined that the AP 14 does not have broadcast data and/or multicast data for the client station 25, the flow proceeds to block 564, at which the network interface 27 powers down at least partially (i.e., so that the network interface 27 cannot transmit or receive via the wireless medium) until some subsequent time, in some embodiments and/or scenarios (e.g., when the client station 25 does not have uplink data to be transmitted to the AP 14).

On the other hand, if it is determined at block 560 that the AP 14 does have buffered downlink data for the client station 25, the flow proceeds to block 568. At block 568, the network interface 27 determines when to subsequently wake up to analyze a beacon that includes information that indicates when the AP 14 will transmit the broadcast/multicast data. For example, the AP 14 may subsequently transmit information in a particular beacon frame that indicates when the AP 14 will transmit the broadcast/multicast data, and the data unit received at block 558 includes information indicating which beacon will include the information that indicates when the AP 14 will transmit the broadcast/multicast data, in an embodiment. The flow then proceeds to block 564, in an embodiment.

In some embodiments, a network interface of the first device (e.g., the network interface 27) performs the method 550 (or a similar method) periodically when the network interface is in the power save mode. For example, in an embodiment, the network interface of the first device attempts to transmit a data unit such as the data unit 112 to the second device periodically when the network interface of the first device is in the power save mode. In another embodiment, the network interface of the first device performs the method 550 (or a similar method) when the network interface 27 is in the power save mode and when the first device has uplink data to transmit to the second device. For example, in an embodiment, the network interface of the first device attempts to transmit a data unit such as the data unit 112 to the second device when the network interface of the first device is in the power save mode and when the first device has uplink data to transmit to the second device. In another embodiment, the network interface of the first device the method 550 (or a similar method) periodically and/or when the network interface of the first device is in the power save mode and when the first device has uplink data to transmit to the second device. For example, in an embodiment, the network interface of the first device attempts to transmit a data unit such as the data unit 112 to the second device when the network interface of the first device is in the power save mode and when the first device has uplink data to transmit to the second device. On the other hand, when the network interface of the first device is in the power save mode but the first device does not have uplink data to transmit to the second device, the network interface of the first device attempts to transmit a data unit such as the data unit 112 to the second device periodically.

In another embodiment similar to above-discussed methods, the network interface 27 of the client station 25 generates and transmits a poll data unit that includes a plurality of indications of what types of information the client station 25 is requesting from the AP 14. For example, the poll data unit includes indications of whether the client station 25 is requesting two or more of (i) whether the AP 14 has buffered unicast downlink data for the client station 25, (ii) update information for the BSS, (iii) whether the AP 14 has broadcast data and/or multicast data for the client station 25, and (iv) a timestamp. In an embodiment, the indication of a request for whether the AP 14 has broadcast/multicast data includes a group address corresponding to the client station 25 to facilitate the AP 14 quickly determining whether there is multicast data for the client station 25. In response, the AP 14 analyzes the indications to determine what information (if any) is being requested. The AP 14 generates and transmits one or more data units to provide the requested information (if any), in an embodiment. In an embodiment, the poll data unit includes a field (e.g., a bit) set to a value to indicate to the AP 14 the data unit is a request for information (such as described above) from the AP 14.

In an embodiment, the response to the poll data unit is included in a short null data packet (NDP) frame when the response does not include a timestamp field. In an embodiment, the NDP format poll-response frame includes one or more of 1) an NDP frame type indication; 2) a return address (RA) identification; 3) a unicast buffered data unit(s) indication; 4) group-addressed (e.g., broadcast and/or multicast) buffered data unit(s) indication; 5) a BSS change sequence (update information for the BSS).

In an embodiment in which the poll-response frame is an NDP, the poll-response frame omits a duration field (which is typically needed in other short control response frames). In an embodiment, the vacant space obtained by omitting the duration field can be used to carry 3), 4) and/or 5). In an embodiment, if there is a need for timestamp information, the client station 25 sends a probe request data unit for a probe response with a timestamp or the client station 25 waits for a next beacon/TIM frame.

When a client station 25 in a power save mode receives a Poll-Response frame and finds there are new BSS changes, the client station 25 sends a Probe Request to get updated BSS information, in an embodiment. In another embodiment, when a client station 25 in a power save mode receives a Poll-Response frame and finds there are new BSS changes, the client station 25 checks a next short/full beacon to get the updated BSS information.

When client station 25 in a power save mode receives a poll-response frame and finds that the AP will send group-addressed buffered data units right after a next DTIM beacon, it will be useful to the client station 25 to know one or both of 1) the duration to the next DTIM beacon; and 2) current timing of the AP 14 (e.g., a timestamp of the clock of the AP 14), in an embodiment. The client station 25 can obtain the current timestamp from the poll-response frame (if included in the poll-response frame), in an embodiment. Additionally, the client station 25 can obtain the current timestamp by waiting for a next beacon/TIM frame, which includes a timestamp, in an embodiment.

In an embodiment, the network interface 27 of the client station 25 determines a time period to the next DTIM beacon using a DTIM count and/or a DTIM period included in the poll-response frame. In an embodiment, the poll-response frame includes a DTIM count and/or a DTIM period when there is a group-addressed buffered data unit(s) pending. In an embodiment, the network interface 27 of the client station 25 determines a time period to the next DTIM beacon using DTIM timing information, such as at least one of 1) a time synchronization function (TSF) 0 offset (e.g., a number of beacon intervals between TSF 0 and the first DTIM beacon); and 2) a DTIM period. In an embodiment, the TSF 0 offset and/or the DTIM period are obtained by the client station 25 in a full beacon. In another embodiment, the TSF 0 offset and/or the DTIM period are obtained by the client station 25 in a probe response frame and/or a poll response frame.

In an embodiment, the AP 14 generates a probe response frame and/or a poll response frame to include DTIM timing information. In an embodiment, a request field and/or element bitmap is included in a probe request data unit generated by a client station 25 to request certain fields/elements (such as a timestamp, DTIM timing information, etc.) within a probe response frame (generated and transmitted by the AP 14 in response to the probe request), thus reducing the size of the probe response frame. In an embodiment, fields/elements that are requested very often can be put in an early portion of a probe response frame.

In some wireless local area networks (WLANs), a client station is a mobile smart phone that includes a WLAN network interface. In such WLANs, a user can choose to offload mobile smart phone traffic to and from the cellular network to the WLAN. Referring to FIG. 1, as an example, the AP 14 is coupled to a metropolitan area network (MAN), a wide area network (WAN), the Internet, etc., via a network interface (not shown) separate from the WLAN network interface 16, in an embodiment. Offloaded cellular traffic is transmitted to and received from a cellular service provided via the separate network interface, and is transmitted to and received from the mobile smart phone 25 via the network interface 10, in an embodiment.

Offloaded cellular traffic will consume (at least in some situations and/or embodiments) a considerable amount of the available spectrum resources of the WLAN, and can reduce the performance of the WLAN with respect to other types of data, such as data transmitted to and/or received from power-constrained or very low power stations 25 (such as battery-powered sensor devices) operating in the power save mode. Several example techniques are described herein for mitigating the effect of offloaded cellular data on other types of data in the WLAN, according to a variety of embodiments.

In an embodiment, the network interface 16 of the AP 14 is configured to give higher channel access priority to transmissions involving a client station 25 in a power save mode as compared to transmissions involving off load of cellular data. For example, the network interface 16 of the AP 14 is configured to, with regard to the reservation of transmission opportunities (TXOPs), give higher channel access priority to transmissions involving a power-constrained or very low power client station 25 (such as a battery-powered sensor device) in a power save mode as compared to transmissions involving off load of cellular data, in an embodiment.

In an embodiment, the network interface 16 of the AP 14 and the network interface 27 of a client station 25 are configured to generate a shorter channel scanning delay (before a random backoff time period) for transmissions associated with power-constrained or very low power client stations 25 in the power save mode as compared to the channel scanning delay for transmissions involving off load of cellular data. In an embodiment, the network interface 16 of the AP 14 and the network interface 27 of a client station 25 are configured to generate a shorter random backoff time period, on average, for transmissions associated with power-constrained or very low power client stations 25 in the power save mode as compared to the random backoff time period, on average, for transmissions involving off load of cellular data. In an embodiment, the network interface 16 of the AP 14 and the network interface 27 of a client station 25 are configured (i) to generate a shorter channel scanning delay for transmissions associated with power-constrained or very low power client stations 25 in the power save mode as compared to the channel scanning delay for transmissions involving off load of cellular data, and (ii) to generate a shorter random backoff time period, on average, for transmissions associated with power-constrained or very low power client stations 25 in the power save mode as compared to the random backoff time period, on average, for transmissions involving off load of cellular data.

In an embodiment, the network interface 16 of the AP 14 and the network interface 27 of a client station 25 are configured to limit the duration of transmissions corresponding to offload of cellular data. For example, in an embodiment, the network interface 16 of the AP 14 and the network interface 27 of the client station 25 are configured to permit transmissions corresponding to offload of cellular data only using a channel bandwidth that is greater than minimum channel bandwidth of the WLAN 10. For instance, the WLAN system 10 may be capable of using channels of different bandwidths (e.g., a set including the bandwidths 20 MHz, 40 MHz, and 80 MHz, or another suitable set of channel bandwidths), and the network interface 16 of the AP 14 and the network interface 27 of the client station 25 are configured to permit transmissions corresponding to offload of cellular data only using a channel bandwidth that is greater than minimum channel bandwidth of the WLAN 10. In an embodiment, the network interface 16 of the AP 14 and the network interface 27 of the client station 25 are configured to not permit transmission of cellular offload data when only the minimum channel bandwidth of the WLAN 10 is available.

In an embodiment, the network interface 16 of the AP 14 and the network interface 27 of the client station 25 are configured to not permit a TXOP for transmission of cellular offload data to be extended, at least in some circumstances. For example, the network interface 16 of the AP 14 and the network interface 27 of the client station 25 are configured to not permit a TXOP for transmission of cellular offload data to be extended when any client station 25 in the WLAN 10 is in power save mode, in an embodiment. In another embodiment, the network interface 16 of the AP 14 and the network interface 27 of the client station 25 are configured to not permit a TXOP for transmission of cellular offload data to be extended regardless of whether any client station 25 in the WLAN 10 is in power save mode.

In an embodiment, when a TXOP is truncated, the network interface 16 of the AP 14 and the network interface 27 of the client station 25 are configured to require that, for transmission of cellular offload data, the transmission must wait at least until the end of the original TXOP, at least in some circumstances. This assists client stations 25 in power save mode that may have missed the truncation of TXOP due to power down of the network interface 27. For example, the network interface 16 of the AP 14 and the network interface 27 of the client station 25 are configured to require that, for transmission of cellular offload data, the transmission must wait at least until the end of the original TXOP when any client station 25 in the WLAN 10 is in power save mode, in an embodiment. In another embodiment, the network interface 16 of the AP 14 and the network interface 27 of the client station 25 are configured to require that, for transmission of cellular offload data, the transmission must wait at least until the end of the original TXOP regardless of whether any client station 25 in the WLAN 10 is in power save mode.

In an embodiment, the network interface 16 of the AP 14 and the network interface 27 of the client station 25 are configured to include in data units that carry cellular offload data information that indicates an amount of time that the transmission (and optionally associated transmissions such as acknowledgments) will occupy the channel. In an embodiment, the network interface 16 of the AP 14 and the network interface 27 of the client station 25 are configured to include in data units that carry cellular offload data information that indicates an amount of time of a TXOP corresponding to the transmission. Such channel occupation duration information facilitates, at least in some embodiment, a client device 25 in a power save mode to determine a length of time to power down the network interface 27 while the transmission carrying cellular offload data is occurring.

As discussed above, the AP 14 schedules uplink and downlink transmissions for client stations 25 in the power save mode, in some embodiments and/or scenarios. In an embodiment, the AP 14 (e.g., the network interface 17) establishes a contention free period for scheduled uplink and downlink transmissions for client stations 25 in the power save mode. In an embodiment, the contention free period occurs immediately after a beacon transmission (i.e., no contention period exists between the beacon and the contention free period). In another embodiment, the contention free period occurs at another suitable location between beacon transmissions. In an embodiment, the AP 14 (e.g., the network interface 17) is configured to determine pending uplink and/or downlink transmissions to/from client stations 25 in the power save mode, and to establish a contention free period based on the pending uplink and/or downlink transmissions to/from client stations 25 in the power save mode. For example, if the AP 14 (e.g., the network interface 17) determines that there are no pending uplink and/or downlink transmissions to/from client stations 25 in the power save mode, the AP 14 (e.g., the network interface 17) is configured to determine that no contention free period for scheduled uplink and downlink transmissions for client stations 25 in the power save mode is established for a particular beacon period (i.e., a period between beacon data unit transmissions), in an embodiment. As another example, if the AP 14 (e.g., the network interface 17) determines that there is pending uplink and/or downlink transmissions to/from client stations 25 in the power save mode, the AP 14 (e.g., the network interface 17) is configured to determine that a contention free period for scheduled uplink and downlink transmissions for client stations 25 in the power save mode is to be established for a particular beacon period, in an embodiment. In an embodiment, the AP 14 (e.g., the network interface 17) is configured to determine a length of the contention free period based on an amount (or number) of pending uplink and/or downlink transmissions to/from client stations 25 in the power save mode, in an embodiment.

In an embodiment, the network interface 17 of the AP 14 is configured to not attempt to transmit mobile telephony offload data during a contention free period for scheduled uplink and downlink transmissions for client stations 25 in the power save mode. In an embodiment, the network interface 27 of a client station 25 with mobile telephony offload data to be transmitted is configured to not attempt to transmit mobile telephony offload data during a contention free period for scheduled uplink and downlink transmissions for client stations 25 in the power save mode.

In an embodiment, the AP 14 (e.g., the network interface 17) is configured to coordinate beacon time and contention free periods with other neighboring APs (if any). In an embodiment, the AP 14 (e.g., the network interface 17) is configured to coordinate beacon time and contention free periods with other neighboring APs (if any) that are serving client stations in the power save mode.

In an embodiment, the AP 14 (e.g., the network interface 17) is configured to reserve the contention free period discussed above within a neighborhood of the AP 14 and a neighborhood of the client stations 25 involved with the contention free period. In an embodiment, client stations 25 (e.g., the network interfaces 287) involved with the contention free period are configured to help spread reservation information concerning the contention free period. For example, in an embodiment, the AP 14 uses a beacon or other broadcast frame to reserve a certain period for contention free access, and the client stations 25 involved in the contention free access send a broadcast frame at the beginning of the contention access period to reserve the medium around within their neighborhood.

Figure 9:
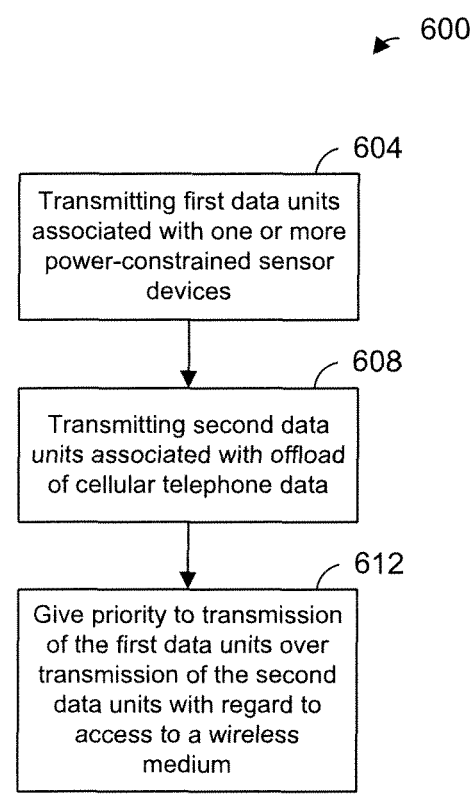
FIG. 9 is a flow diagram of an example method for facilitating coexistence of (i) low power and/or power-constrained sensor devices and (ii) devices transmitting cellular offload data in a wireless network, according to an embodiment.

FIG. 9 is a flow diagram of an example method 600 for facilitating coexistence of (i) low power and/or power-constrained sensor devices and (ii) devices transmitting cellular offload data in a wireless network. FIG. 9 will be described with reference to FIG. 1 for ease of explanation. In other embodiments, however, a suitable system different than the system 10 of FIG. 1 may utilize the method 600. In an embodiment, the method 600 is implemented by the network interface 16 of the AP 14. In another embodiment, the method 600 is implemented by the network interface 27 of a client device 25. In another embodiment, the method 600 is implemented jointly by multiple ones of the network 16 of the AP 14 and one or more network interfaces 27 of one or more client devices 25.

At block 604, first data units associated with one or more power-constrained sensor devices are transmitted in a wireless network. At block 608, second data units associated with offload of cellular telephone data are transmitted in the wireless network. At block 612, priority is given to transmission of the first data units over transmission of the second data units with regard to access to a wireless medium of the wireless network. Examples of techniques for giving priority to transmission of the first data units over transmission of the second data units are discussed above, and one or more of these techniques are utilized in various embodiments.

Figure 10:
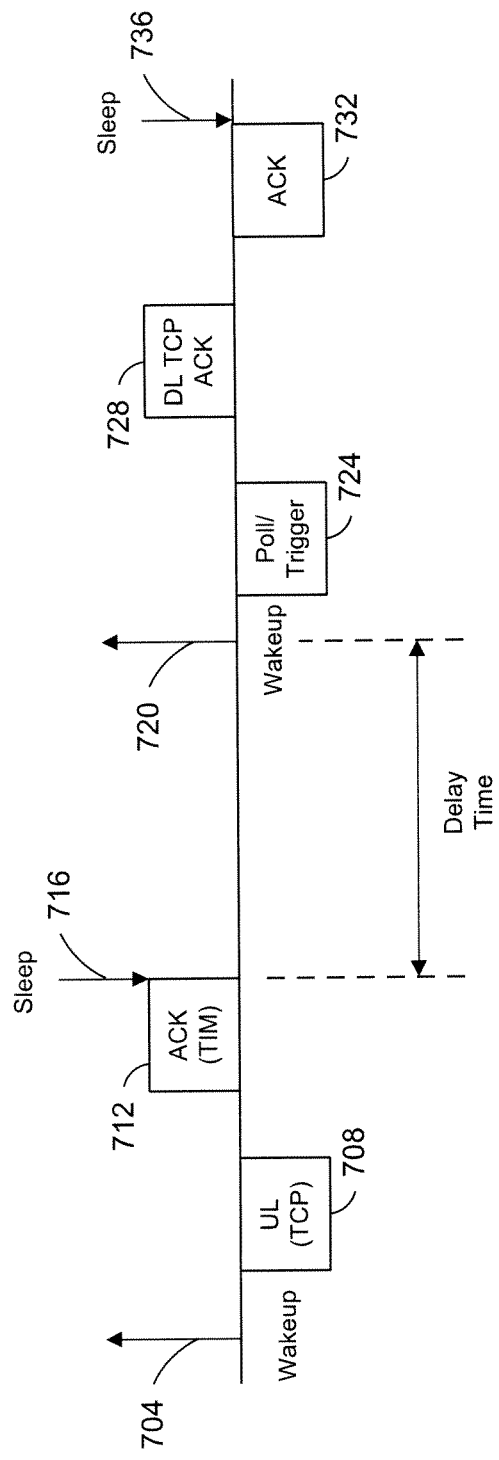
FIG. 10 is a transmission timing diagram illustrating an example method in which a first station in a power save mode transmits to a second station a frame corresponding to a protocol above a second layer (e.g., above the MAC layer) in a protocol stack, according to an embodiment.

FIG. 10 is a transmission timing diagram illustrating another embodiment of a method in which a client station in a power save mode transmits to another device (e.g., an AP) a frame corresponding to a protocol above a second layer (e.g., above the MAC layer) in a protocol stack. The timing diagram of FIG. 10 will be described with reference to FIG. 1 for ease of explanation. In other embodiments, however, a suitable system different than the system 10 of FIG. 1 may utilize the method illustrated in FIG. 10. The example of FIG. 10 is discussed, for ease of explanation, in the context of the protocol above the second layer in the protocol stack being the transmission control protocol (TCP). In other embodiments, other suitable protocols above the second layer in the protocol stack are utilized.

In FIG. 10, a client station 25 is in a power save mode and powers up at least a portion of the network interface 27 in order to transmit to the AP 14 a TCP frame, or at least an end portion of the TCP frame. In an embodiment, the TCP frame (or end portion of the TCP frame) is included in a physical layer data unit. At a time 704, the network interface 27 is powered up and ready to transmit. The network interface 27 scans the wireless medium for a minimum time period (not shown) in order to determine whether the medium is busy, as discussed above. The network interface 27 generates and transmits a data unit 708 that includes the TCP frame (or end portion of the TCP frame).

In response to the data unit 708, the AP 14 generates and transmits to the client station 25 an acknowledgment data unit 712. In an embodiment, the acknowledgment data unit 712 includes a TIM information element that indicates whether the AP 14 has buffered downlink data for the client station 25. In an embodiment, the TIM includes an indication that there is not any buffered data unit (BU) to facilitate the client station 25 powering down the network interface 27 after the client station 25 receives the data unit 712. In an embodiment, a bit corresponding to the AID of the client station 25 is set to zero to indicate that there is no BU for the client station 25. In an embodiment in which a TIM information element is not included in the acknowledgment data unit 712, a field is included in the acknowledgment data unit 712 to indicate whether there is any BU for the client station 25. In an embodiment, a field is included in the acknowledgment data unit 712 and set to indicate that that there is not any buffered data unit (BU) to facilitate the client station 25 powering down the network interface 27 after the client station 25 receives the data unit 71.

In an embodiment, the data unit 712 also includes an indication of a delay time after which the AP 14 will be ready to transmit downlink data to the client station 25. For example, it may take the AP 14 some time to process the TCP frame and/or to prepare for a transmission of a TCP acknowledgment to the client station 25. Thus, the AP 14 includes the indication of the delay time to facilitate powering down the network interface 27 of the client station 25 during the delay. In an embodiment, the delay time corresponds to a minimum time before which the network interface 27 of the client station 25 should not poll the AP 14 for the TCP acknowledgment. In another embodiment, the delay time corresponds to a time of transmission of a next beacon frame. In an embodiment, the network interface 16 of the AP 14 is configured to determine the delay time. In another embodiment, the host processor 15 is configured to determine the delay time.

In another embodiment, the AP 14 does not determine the delay time and/or the data unit 712 does not include an indication of the delay time. Rather, the client station (e.g., the network interface 27) may determine or assume a delay time as discussed further below.

In response to receiving the data unit 712, the network interface 27 of the client station 25 determines a delay time, in some embodiments. For example, when the data unit 712 includes an indication of the delay time, the network interface 27 of the client station 25 determines the delay time based on the indication in the data unit 712. In another embodiment in which the data unit 712 does not include an indication of the delay time, the network interface 27 of the client station 25 determines a delay time using other suitable techniques. In an embodiment, the delay time is assumed by the network interface 27 of the client station 25 to be a predetermined amount of time.

Also in response to the data unit 712, the network interface 27 powers downs at least partially (i.e., so that the network interface 27 cannot transmit or receive via the wireless medium) at time 716 until some subsequent time based on the determined or assumed delay time, in some embodiments and/or scenarios (e.g., when the client station 25 does not have uplink data to be transmitted to the AP 14). The time 716 occurs after the end of the transmission of the data unit 712, in an embodiment.

The network interface 27 powers back up at a time 720, which is determined based on the determined or assumed delay time. Subsequently, the network interface 27 generates and transmits a data unit 724 that prompts the AP 14 to transmit buffered downlink data for the client station 25. The data unit 724 may be referred to as a trigger or a poll. In some embodiments, the data unit 724 includes uplink data (i.e., data to be transmitted from the client station 25 to the AP 14) when the client station 25 has uplink data to be transmitted. In an embodiment, the data unit 724 omits uplink data even when the client station 25 has uplink data to be transmitted. In some embodiments, the data unit 724 is transmitted only after determining that the medium is not busy at least for the minimum time period.

In response to the trigger 724, the AP 14 transmits to the client station a data unit 728 that includes TCP acknowledgment for the TCP frame transmitted earlier by the client station 25. The TCP acknowledgment is stored in a memory of or coupled to the network interface 16 of the AP 14 and the network interface 16 retrieves the TCP acknowledgment from the memory when the network interface 728 in order to transmit the TCP acknowledgment, in an embodiment. In an embodiment, the data unit 728 is stored in the memory of or coupled to the network interface 16 of the AP 14 and the network interface 16 retrieves the data unit 728 from the memory in order to transmit the data unit 728, in an embodiment.

In an embodiment, the AP 14 treats the data unit 728 as a high priority power save frame in order to expedite transmission of the data unit 728 to quickly respond to the trigger 724.

The network interface 27 of the client station 25 receives and processes the data unit 728. The network interface 27 generates and transmits an acknowledgment data unit 732 in response to receiving the data unit 728. The network interface 27 powers down at a time 736 subsequent to the end of the acknowledgment data unit 732.

The IEEE 802.11v Standard has introduced power save features that allow client stations to sleep for longer durations between transmission and/or reception of data units. Additionally, the IEEE 802.11v Standard allows a client station to not communicate with the AP for longer durations and yet not be disassociated with a basic service set (BSS) organized by the AP.

As discussed above, some WLANs may include a mix of (i) typical user devices such as laptop computers, desktop computers, and mobile phones, and (ii) sensor devices. Some sensor devices have power supplied only by a battery and/or the sensor device is designed for very infrequent recharge of the battery, in some embodiments. Some sensor devices with power supplied by a battery are not designed for recharge of the battery and/or are not designed for easy replacement of the battery, in some embodiments. In some embodiments, at least some sensor devices have much more stringent power use requirements as compared to typical user devices (e.g., laptop computers, desktop computers, mobile phones, etc.). In some embodiments, network interfaces of some sensor devices are configured to remain in the power save state for much longer periods as compared to network interfaces of typical user devices. For example, a network interface of a mobile telephone is configured to remain in the sleep mode for a maximum time period in the order of seconds, whereas a network interface of a sensor device is configured to remain in the sleep mode for a maximum time period in the order of hours.

The IEEE 802.11v Standard specifies several parameters to facilitate sleep mode operation of client stations. For example, a BSS maximum idle parameter corresponds to a maximum duration of a time period during which an AP receives no communications from a client station in the BSS and will not disassociate the client station from the BSS. In other words, if the AP receives no communications from a client station for a duration that exceeds the BSS maximum idle parameter, the AP can disassociate the client station from the BSS.

At least in some situations, a desirable setting for the BSS maximum idle parameter for typical user devices (e.g., laptop computers, desktop computers, mobile phones, etc.) is significantly different than a desirable setting for the BSS maximum idle parameter for sensor devices. For example, a desirable setting of the BSS maximum idle parameter for sensor devices is at least an order of magnitude larger than the a desirable setting for the BSS maximum idle parameter for typical user devices.

At least in some situations, desirable settings for other types of parameters for a BSS significantly differ between typical user devices (e.g., laptop computers, desktop computers, mobile phones, etc.) and devices sensor devices. Examples of such parameters include a basic rate (or basic rate set) for the BSS, an encryption mode for the BSS, a wireless network management (WNM) sleep duration parameter, etc.

In an embodiment, an AP organizes at least two BSSs including a first BSS and a second BSS. The first BSS corresponds to one or more first client stations, and the second BSS corresponds to one or more second client stations. In an embodiment, at least one first client station is a sensor device, whereas at least one second client station is not a sensor device. In an embodiment, each first client station is a sensor device, whereas each second client station is not a sensor device. In other embodiments, at least one first client station is a sensor device and at least another first client station is not a sensor device. In other embodiments, at least one second client station is not a sensor device and at least another first client station is a sensor device.

The AP transmits to the first client station(s) in the first BSS a first value of a first parameter that indicates a time duration during which the AP will not dissociate a client station due to not receiving at least one frame from the client station. In an embodiment, the first parameter is the BSS maximum idle parameter. In other embodiments, the first parameter is another suitable parameter indicates a time duration during which the AP will not dissociate a client station due to not receiving at least one frame from the client station.

Additionally, the AP transmits to the second client station(s) in the second BSS a second value of the first parameter. In an embodiment, the first value of the first parameter is at least an order of magnitude larger than the second value of the first parameter. In an embodiment, the first value of the first parameter is at least two orders of magnitude larger than the second value of the first parameter. In an embodiment, the first value of the first parameter is at least three orders of magnitude larger than the second value of the first parameter. In an embodiment, the first value of the first parameter is greater than one hour, and the second value of the first parameter is less than one minute. In an embodiment, the first value of the first parameter is greater than ten hours, and the second value of the first parameter is less than one minute. In an embodiment, the first value of the first parameter is greater than one hundred hours, and the second value of the first parameter is less than one minute.

In an embodiment, the AP receives from a first client station a value of a second parameter corresponding to the first client station. The second parameter indicates a time period between when the first client station in the first BSS periodically awakes from a power save mode. In an embodiment, the value of the second parameter corresponds to a time period greater than the second value of the first parameter. In an embodiment, the second parameter is the WNM sleep duration parameter. In other embodiments, the second parameter is another suitable parameter that indicates a time period between when the first client station in the first BSS periodically awakes from a power save mode.

In an embodiment, the AP transmits to the first client station(s) a first value of a third parameter that indicates a basic data rate utilized by the AP, and transmits to the second client station(s) a second value of the third parameter. In an embodiment, the first value of the third parameter is different than the second value of the third parameter.

In an embodiment, the AP transmits to the first client station(s) a first value of a fourth parameter that indicates an encryption mode utilized by the AP, and transmits to the second client station(s) a second value of the fourth parameter. In an embodiment, the first value of the fourth parameter is different than the second value of the fourth parameter. In an embodiment, the AP utilizes encryption with the first client station(s) and does not utilize encryption with the second client station(s). In an embodiment, the AP does not utilize encryption with the first client station(s) and utilizes encryption with the second client station(s).

Referring to FIG. 1, in an embodiment, the network interface 16 of the AP 14 is configured to transmit to the first client station(s) and the second client station(s) one or more of the first through fourth parameters discussed above.

Figure 11:
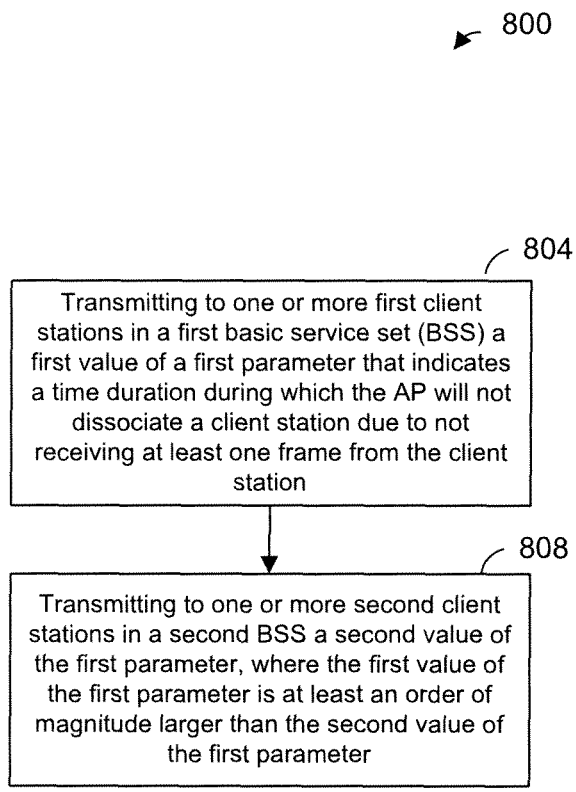
FIG. 11 is a flow diagram of an example method for facilitating coexistence of (i) low power and/or power-constrained sensor devices and (ii) devices transmitting cellular offload data in a wireless network, according to an embodiment.

FIG. 11 is a flow diagram of an example method 800 for facilitating coexistence of (i) low power and/or power-constrained sensor devices and (ii) devices transmitting cellular offload data in a wireless network. FIG. 11 will be described with reference to FIG. 1 for ease of explanation. In other embodiments, however, a suitable system different than the system 10 of FIG. 1 may utilize the method 800. In an embodiment, the method 800 is implemented by the network interface 16 of the AP 14.

At block 804, the AP 14 transmits, to one or more first client stations in a first basic service set (BSS), a first value of a first parameter that indicates a time duration during which the AP 14 will not dissociate a client station due to not receiving at least one frame from the client station.

At block 808, the AP 14 transmits, to one or more second client stations in a second BSS, a second value of the first parameter, where the first value of the first parameter is at least an order of magnitude larger than the second value of the first parameter.

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
organizing, at an access point device, a first wireless local area network (WLAN) corresponding to a first basic service set (BSS) and a second WLAN corresponding to a second BSS, including
setting a value of a first parameter of the first WLAN that indicates a time duration during which the access point device will not dissociate first client stations in the first WLAN due to lack of communications from the first client stations, and
setting a value of a second parameter of the second WLAN that indicates a time duration during which the access point device will not dissociate second client stations in the second WLAN due to lack of communications from the second client stations, wherein the value of the first parameter is at least an order of magnitude larger than the value of the second parameter;

transmitting, with the access point device, to one or more first client stations in the first WLAN the value of the first parameter; and transmitting, with the access point device, to one or more second client stations in the second WLAN the value of the second parameter.

2. A method according to claim 1, wherein organizing the first WLAN and the second WLAN further includes
setting a value of a third parameter of the first WLAN that indicates a basic data rate utilized by the access point device when communicating with first client stations in the first WLAN, and
setting a value of a fourth parameter of the second WLAN that indicates a basic data rate utilized by the access point device when communicating with second client stations in the second WLAN,
wherein the value of the third parameter is different than the value of the fourth parameter; and
the method further comprises:
transmitting, with the access point device, to the one or more first client stations in the first WLAN the third parameter, and
transmitting, with the access point device, to the one or more second client stations in the second WLAN the fourth parameter.

3. A method according to claim 1, wherein organizing the first WLAN and the second WLAN further includes
setting a value of a third parameter of the first WLAN that indicates an encryption mode utilized by the access point device when communicating with first client stations in the first WLAN, and
setting a value of a fourth parameter of the second WLAN that indicates an encryption mode utilized by the access point device when communicating with second client stations in the second WLAN,
wherein the value of the third parameter is different than the value of the fourth parameter; and
the method further comprises:
transmitting, with the access point device, to the one or more first client stations in the first WLAN the third parameter, and
transmitting, with the access point device, to the one or more second client stations in the second WLAN the fourth parameter.

4. A method according to claim 1, wherein the value of the first parameter is greater than one hour, and the value of the second parameter is less than one minute.

5. An access point device for use in a wireless communication network, the access point device comprising:
a network interface configured to
organize a first wireless local area network (WLAN) corresponding to a first basic service set (BSS) and a second WLAN corresponding to a second BSS, including
setting a value of a first parameter of the first WLAN that indicates a time duration during which the access point device will not dissociate first client stations in the first WLAN due to lack of communications from the first client stations, and
setting a value of a second parameter of the second WLAN that indicates a time duration during which the access point device will not dissociate second client stations in the second WLAN due to lack of communications from the second client stations,
wherein the value of the first parameter is at least an order of magnitude larger than the value of the second parameter;
wherein the network interface is further configured to:
transmit to one or more first client stations in the first WLAN the value of the first parameter and
transmit to one or more second client stations in the second WLAN the value of the second parameter.

6. An access point device according to claim 5, wherein the network interface is configured to:
set a value of a third parameter of the first WLAN that indicates a basic data rate utilized by the access point device when communicating with first client stations in the first WLAN, and
set a value of a fourth parameter of the second WLAN that indicates a basic data rate utilized by the access point device when communicating with second client stations in the second WLAN,
wherein the value of the third parameter is different than the value of the fourth parameter; and
the network interface is further configured to:
transmit to the one or more first client stations in the first WLAN the third parameter, and
transmit to the one or more second client stations in the second WLAN the fourth parameter.

7. An access point device according to claim 5, wherein the network interface is configured to:
set a value of a third parameter of the first WLAN that indicates an encryption mode utilized by the access point device when communicating with first client stations in the first WLAN, and
set a value of a fourth parameter of the second WLAN that indicates an encryption mode utilized by the access point device when communicating with second client stations in the second WLAN,
wherein the value of the third parameter is different than the value of the fourth parameter; and
the network interface is further configured to:
transmit to the one or more first client stations in the first WLAN the third parameter, and
transmit to the one or more second client stations in the second WLAN the fourth parameter.

8. An access point device according to claim 5, wherein the value of the first parameter is greater than one hour, and the value of the second parameter is less than one minute.

* * * * *